US012636656B2

(12) United States Patent
Luo et al.

(10) Patent No.: US 12,636,656 B2
(45) Date of Patent: May 26, 2026

(54) CRYOGENIC MILLING TECHNIQUES FOR FABRICATION OF NANOSTRUCTURED ELECTRODES

(71) Applicant: The Regents of the University of California, Oakland, CA (US)

(72) Inventors: Jian Luo, San Diego, CA (US); Qizhang Yan, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 472 days.

(21) Appl. No.: 18/044,732

(22) PCT Filed: Sep. 10, 2021

(86) PCT No.: PCT/US2021/049862
§ 371 (c)(1),
(2) Date: Mar. 9, 2023

(87) PCT Pub. No.: WO2022/056260
PCT Pub. Date: Mar. 17, 2022

(65) Prior Publication Data

US 2023/0338964 A1 Oct. 26, 2023

Related U.S. Application Data

(60) Provisional application No. 63/077,488, filed on Sep. 11, 2020.

(51) Int. Cl.
*B02C 17/18* (2006.01)
*B22F 1/054* (2022.01)
(Continued)

(52) U.S. Cl.
CPC .......... *B02C 17/1815* (2013.01); *B22F 1/054* (2022.01); *B22F 1/12* (2022.01);
(Continued)

(58) Field of Classification Search
CPC ........ B02C 17/1815; B22F 1/054; B22F 1/12; B22F 9/04; B22F 2009/043;
(Continued)

(56) References Cited

U.S. PATENT DOCUMENTS 5,044,165 A 9/1991 Linner et al.
8,287,772 B2 10/2012 Le et al.
(Continued)

FOREIGN PATENT DOCUMENTS

CN 108371996 A 7/2018
KR 20180027896 A 3/2018

OTHER PUBLICATIONS

International Search Report and Written Opinion for International Application No. PCT/US2021/049862, mailed on Apr. 13, 2022, 15 pages.

(Continued)

*Primary Examiner* — Adil A. Siddiqui
(74) *Attorney, Agent, or Firm* — Perkins Coie LLP

(57) ABSTRACT

Disclosed are nanostructured materials, devices, systems and methods of their fabrication using cryogenic milling techniques. In some embodiments in accordance with the disclosed technology, a cryogenic milling method for fabricating electrode materials for batteries is described, which can be used to fabricate high volumetric/gravimetric capacity SnSb—C (tin-antimony with carbon) anode material and other alloy/intermetallic type carbon composite battery anode materials for lithium-ion batteries with significantly improved battery energy density and cycle life.

15 Claims, 14 Drawing Sheets

(51) Int. Cl.
*B22F 1/12* (2022.01)
*B22F 9/04* (2006.01)

(52) U.S. Cl.
CPC .......... *B22F 9/04* (2013.01); *B22F 2009/043* (2013.01); *B22F 2202/03* (2013.01)

(58) Field of Classification Search
CPC .... B22F 2202/03; B22F 1/07; B22F 2999/00; H01M 10/0525; H01M 4/134; H01M 4/1395; H01M 4/387; H01M 4/625; Y02E 60/10; C22C 1/0483; C22C 1/05; C22C 2200/04
See application file for complete search history.

(56) References Cited

U.S. PATENT DOCUMENTS

| | | | | |
|---|---|---|---|---|
| 2006/0153728 A1* | 7/2006 | Schoenung | C22C 32/00 | 419/33 |
| 2010/0278679 A1* | 11/2010 | Majumdar | C22C 9/00 | 419/33 |
| 2012/0121495 A1* | 5/2012 | Yang | H10N 10/01 | 241/23 |
| 2013/0082409 A1 | 4/2013 | Guthrie | | |
| 2017/0225233 A1* | 8/2017 | Zhamu | C22C 47/14 | |
| 2020/0095167 A1 | 3/2020 | Slimani | | |

OTHER PUBLICATIONS

Brehm, W., Buchheim, J.R. and Adelhelm, P. (2019), Reactive and Nonreactive Ball Milling of Tin-Antimony (Sn-Sb) Composites and Their Use as Electrodes for Sodium-Ion Batteries with Glyme Electrolyte. Energy Technol., 7: 1900389, 10 pages.
Nishi, Y. Lithium Ion Secondary Batteries; Past 10 Years and the Future. J. Power Sources 2001, 100 (1-2), 101-106.
Endo, M.; Kim, C.; Nishimura, K.; Fujino, T.; Miyashita, K. Recent Development of Carbon Materials for Li Ion Batteries. Carbon N. Y. 2000, 38 (2), 183-197.
Cook, J. B.; Detsi, E.; Liu, Y.; Liang, Y. L.; Kim, H. S.; Petrissans, X.; Dunn, B.; Tolbert, S. H. Nanoporous Tin with a Granular Hierarchical Ligament Morphology as a Highly Stable Li-Ion Battery Anode. ACS Appl. Mater. Interfaces 2017, 9 (1), 293-303.
Detsi, E.; Petrissans, X.; Yan, Y.; Cook, J. B.; Deng, Z.; Liang, Y. L.; Dunn, B.; Tolbert, S. H. Tuning Ligament Shape in Dealloyed Nanoporous Tin and the Impact of Nanoscale Morphology on Its Applications in Na-Ion Alloy Battery Anodes. Phys. Rev. Mater. 2018, 2 (5), 32-37. https://doi.org/10.1103/PhysRevMaterials.2.055404.
Cook, J. B.; Lin, T. C .; Detsi, E.; Weker, J. N.; Tolbert, S. H. Using X-Ray Microscopy to Understand How Nanoporous Materials Can Be Used to Reduce the Large vol. Change in Alloy Anodes. Nano Lett. 2017, 17 (2), 870-877. https://doi.org/10.1021/acs.nanolett.6b04181.
Dong, Z.; Zhang, R.; Ji, D.; Chernova, N. A.; Karki, K.; Sallis, S.; Piper, L.; Stanley Whittingham, M. The Anode Challenge for Lithium-Ion Batteries: A Mechanochemically Synthesized Sn-Fe-C Composite Anode Surpasses Graphitic Carbon. Adv. Sci. 2016, 3 (4), 1-8.
Park, A. R.; Park, C. M. Cubic Crystal-Structured SnTe for Superior Li- and Na-Ion Battery Anodes. ACS Nano 2017, 11 (6), 6074-6084.
Obrovac, M. N.; Chevrier, V. L. Alloy Negative Electrodes for Li-Ion Batteries. Chem. Rev. 2014, 114 (23), 11444-11502.
Kumar, N.; Biswas, K. Cryomilling: An Environment Friendly Approach of Preparation Large Quantity Ultra Refined Pure Aluminium Nanoparticles. J. Mater. Res. Technol. 2019, 8 (1), 63-74.
Ferguson, P. P.; Le, D. B.; Todd, A. D. W.; Martine, M. L.; Trussler, S.; Obrovac, M. N.; Dahn, J. R. Nanostructured Sn30Co30C40 Alloys for Lithium-Ion Battery Negative Electrodes Prepared by Horizontal Roller Milling. J. Alloys Compd. 2014, 595, 138-141. https://doi.org/10.1016/j.jallcom.2014.01.159.
Park, M. G.; Lee, D. H.; Jung, H .; Choi, J. H.; Park, C. M. Sn-Based Nanocomposite for Li-Ion Battery Anode with High Energy Density, Rate Capability, and Reversibility. ACS Nano 2018, 12 (3), 2955-2967. https://doi.org/10.1021/acsnano.8b00586.
Lee, D. H.; Park, C. M. Tin Selenides with Layered Crystal Structures for Li-Ion Batteries: Interesting Phase Change Mechanisms and Outstanding Electrochemical Behaviors. ACS Appl. Mater. Interfaces 2017, 9 (18), 15439-15448. https://doi.org/10.1021/acsami. 7601829.
Liu, N.; Lu, Z.; Zhao, J.; Mcdowell, M. T.; Lee, H. W.; Zhao, W.; Cui, Y. A Pomegranate-Inspired Nanoscale Design for Large-vol. Change Lithium Battery Anodes. Nat. Nanotechnol. 2014, 9 (3), 187-192. https://doi.org/10.1038/nnano.2014.6.
Wang, B.; Li, X.; Zhang, X.; Luo, B.; Zhang, Y.; Zhi, L. Contact-Engineered and Void-Involved Silicon/Carbon Nanohybrids as Lithium-Ion-Battery Anodes. Adv. Mater. 2013, 25 (26), 3560-3565. https://doi.org/10.1002/adma.201300844.
Kim, H.; Cho, J. Superior Lithium Electroactive Mesoporous Si@Carbon Core-Shell Nanowires for Lithium Battery Anode Material. Nano Lett. 2008, 8 (11), 3688-3691. https://doi.org/10.1021/n1801853x.
Fan, Q.; Chupas, P. J.; Whittingham, M. S. Characterization of Amorphous and Crystalline Tin-Cobalt Anodes. Electrochem. Solid-State Lett. 2007, 10 (12), 274-278. https://doi.org/10.1149/1.2789418.
Ferguson, P. P.; Martine, M. L.; George, A. E.; Dahn, J. R. Studies of Tin-Transition Metal-Carbon and Tin-Cobalt-Transition Metal-Carbon Negative Electrode Materials Prepared by Mechanical Attrition. J. Power Sources 2009, 194 (2), 794-800. https://doi.org/10.1016/j.jpowsour.2009.05.031.
Suryanarayana, C. Mechanical Alloying and Milling. Prog. Mater. Sci. 2001, 46 (1-2), 1-184. https://doi.org/10.1016/S0079-6425(99)00010-9.
Park, C. M.; Kim, J. H.; Kim, H.; Sohn, H. J. Li-Alloy Based Anode Materials for Li Secondary Batteries. Chem. Soc. Rev. 2010, 39 (8), 3115-3141. https://doi.org/10.1039/b919877f.
Dhital, S.; Shrestha, A. K.; Gidley, M. J. Effect of Cryo-Milling on Starches: Functionality and Digestibility. Food Hydrocoll. 2010, 24 (2-3), 152-163. https://doi.org/10.1016/j.foodhyd.2009.08.013.
Devi, A. F.; Fibrianto, K.; Torley, P. J.; Bhandari, B. Physical Properties of Cryomilled Rice Starch. J. Cereal Sci. 2009, 49 (2), 278-284. https://doi.org/10.1016/j.jcs.2008.11.005.
Loick, C.; Gartz, D.; Wattebled, L.; Harren, J. Process for Producing Improved Absorbent Polymers by Means of Cryogenic Grinding. Google Patents 2014.
Witkin, D. B.; Lavernia, E. J. Synthesis and Mechanical Behavior of Nanostructured Materials via Cryomilling. Prog. Mater. Sci. 2006, 51 (1), 1-60. https://doi.org/10.1016/j.pmatsci.2005.04.004.
He, T.; He, X.; Tang, P.; Chu, D.; Wang, X.; Li, P. The Use of Cryogenic Milling to Prepare High Performance A12009 Matrix Composites with Dispersive Carbon Nanotubes. Mater. Des. 2017, 114, 373-382. https://doi.org/10.1016/j.matdes.2016.11.008.
Hubert, P. J.; Kathiresan, K.; Wakabayashi, K. Filler Exfoliation and Dispersion in Polypropylene/as- Received Graphite Nanocomposites via Cryogenic Milling. Polym. Eng. Sci. 2011, 51 (11), 2273-2281. https://doi.org/10.1002/pen.22001.
Li, J. L.; Xiong, Y. C.; Wang, X. D.; Yan, S. J.; Yang, C.; He, W. W.; Chen, J. Z.; Wang, S. Q.; Zhang, X. Y.; Dai, S. L. Microstructure and Tensile Properties of Bulk Nanostructured Aluminum/Graphene Composites Prepared via Cryomilling. Mater. Sci. Eng. A 2015, 626, 400-405. https://doi.org/10.1016/j.msea.2014.12.102.
Antitomaso, P.; Fraisse, B.; Stievano, L.; Biscaglia, S.; Aymé-Perrot, D.; Girard, P .; Sougrati, M. T .; Monconduit, L. SnSb Electrodes for Li-Ion Batteries: The Electrochemical Mechanism and Capacity Fading Origins Elucidated by Using Operando Techniques. J. Mater. Chem. A 2017, 5 (14), 6546-6555. https://doi.org/10.1039/C6TA10138K.
Chao, S. C.; Song, Y. F.; Wang, C. C.; Sheu, H. S.; Wu, H. C.; Wu, N. L. Study on Microstructural Deformation of Working Sn and SnSb Anode Particles for Li-Ion Batteries by in Situ Transmission X-Ray Microscopy. J. Phys. Chem. C 2011, 115 (44), 22040-22047. https://doi.org/10.1021/jp206829q.

(56) References Cited

OTHER PUBLICATIONS

Yang, J.; Winter, M.; Besenhard, J. O. Small Particle Size Multiphase Li-Alloy Anodes for Lithium-Ionbatteries. Solid state ionics 1996, 90 (1-4), 281-287.
Seo, J. U.; Park, C. M. Nanostructured SnSb/MOx (M=Al or Mg)/C Composites: Hybrid Mechanochemical Synthesis and Excellent Li Storage Performances. J. Mater. Chem. A 2013, 1 (48), 15316-15322. https://doi.org/10.1039/c3ta13972g.
Whittingham, M. S. History, Evolution, and Future Status of Energy Storage. Proc. IEEE 2012, 100 (SPL Content), 1518-1534. https://doi.org/10.1109/JPROC.2012.2190170.
Weker, J. N.; Liu, N.; Misra, S.; Andrews, J. C.; Cui, Y.; Toney, M. F. In Situ Nanotomography and Operando Transmission X-Ray Microscopy of Micron-Sized Ge Particles. Energy Environ. Sci. 2014, 7 (8), 2771-2777. https://doi.org/10.1039/c4ee01384k.
Fecht, H. J. Nanostructure Formation by Mechanical Attrition. Nanostructured Mater. 1995, 6 (1-4), 33-42. https://doi.org/10.1016/0965-9773(95)00027-5.
Meyers, M. A.; Mishra, A.; Benson, D. J. Mechanical Properties of Nanocrystalline Materials. Prog. Mater. Sci. 2006, 51 (4), 427-556. https://doi.org/10.1016/j.pmatsci.2005.08.003.
Zhang, X.; Wang, H.; Narayan, J.; Koch, C. C. Evidence for the Formation Mechanism of Nanoscale Microstructures in Cryomilled Zn Powder. Acta Mater. 2001, 49 (8), 1319-1326. https://doi.org/10.1016/S1359-6454(01)00051-9.
Mohamed, F. A. A Dislocation Model for the Minimum Grain Size Obtainable by Milling. Acta Mater. 2003, 51 (14), 4107-4119. https://doi.org/10.1016/S1359-6454(03)00230-1.
Nieh, T. G.; Wadsworth, J. Hall-Petch Relation in Nanocrystalline Solids. Scr. Metall. Mater. 1991, 25 (4), 955-958. https://doi.org/10.1016/0956-716X(91)90256-Z.
Vigolo, B.; Penicaud, A.; Coulon, C.; Sauder, C.; Pailler, R.; Journet, C.; Bernier, P .; Poulin, P. Macroscopic Fibers and Ribbons of Oriented Carbon Nanotubes. Science (80 -. ). 2000, 290 (5495), 1331-1334. https://doi.org/10.1126/science.290.5495.1331.
Shaffer, B. M. S. P.; Windle, A. H. Fabrication and Characterization of Carbon Nanotube / Poly ( Vinyl Alcohol ) Composites **. 1999, 937-941.
Lee, J. H.; Marroquin, J.; Rhee, K. Y.; Park, S. J.; Hui, D. Cryomilling Application of Graphene to Improve Material Properties of Graphene/Chitosan Nanocomposites. Compos. Part B Eng. 2013, 45 (1), 682-687. https://doi.org/10.1016/j.compositesb.2012.05.011.
Omidi, M.; Khodabandeh, A.; Nategh, S.; Khakbiz, M. Wear Mechanisms Maps of CNT Reinforced A16061 Nanocomposites Treated by Cryomilling and Mechanical Milling. Tribol. Int. 2017, 110 (Oct. 2016), 151-160. https://doi.org/10.1016/j.triboint.2017.01.033.
Woo, D. J.; Hooper, J. P.; Osswald, S.; Bottolfson, B. A.; Brewer, L. N. Low Temperature Synthesis of Carbon Nanotube-Reinforced Aluminum Metal Composite Powders Using Cryogenic Milling. J. Mater. Res. 2014, 29 (22), 2644-2656. https://doi.org/10.1557/jmr.2014.300.

* cited by examiner (e)

CRYOGENIC MILLING TECHNIQUES FOR FABRICATION OF NANOSTRUCTURED ELECTRODES

CROSS-REFERENCE TO RELATED APPLICATIONS

This patent document is a U.S.C. § 371 National Stage application of International Application No. PCT/US2021/049862 titled "CRYOGENIC MILLING TECHNIQUES FOR FABRICATION OF NANOSTRUCTURED ELECTRODES" and filed on Sep. 10, 2021, which claims priorities to and benefits of the U.S. Provisional Patent Application No. 63/077,488, titled "CRYOGENIC MILLING TECHNIQUES FOR FABRICATION OF NANOSTRUCTURED ANODES," filed on Sep. 11, 2020. The entire contents of the aforementioned patent applications are incorporated by reference as part of the disclosure of this patent document.

STATEMENT REGARDING FEDERALLY SPONSORED RESEARCH OR DEVELOPMENT

This invention was made with government support under grant no. DE-SC0019381 awarded by the Department of Energy. The government has certain rights in the invention.

TECHNICAL FIELD

This patent document relates to methods, systems, and devices for fabrication of nanostructured components and devices.

BACKGROUND

Nanotechnology provides techniques or processes for fabricating structures, devices, and systems with features at a molecular or atomic scale, e.g., structures in a range of one to hundreds of nanometers in some applications. For example, nano-scale devices can be configured to sizes similar to some large molecules, e.g., biomolecules such as enzymes. Nanosized or nanostructured materials can exhibit various unique properties that are not present in the same materials scaled at larger dimensions and such unique properties can be exploited for a wide range of applications.

SUMMARY

Metallic alloys and intermetallic compounds are of great interest as anode materials due to their high energy density, but they generally suffer from poor cycling life due to large volume expansion that leads to cracking.

Disclosed are nanostructured composite materials, devices, systems and methods of their fabrication using cryogenic milling techniques.

In some embodiments in accordance with the disclosed technology, a cryogenic milling method for fabricating electrode materials for batteries, such as lithium-ion batteries, batteries is described. Cryomilling is a cost-effective manufacturing method that is already widely used in the food industry, polymer powder synthesis, and fabrication of nanostructured alloys. The present technology can be used to fabricate high volumetric/gravimetric capacity SnSb—C (tin-antimony with carbon) anode material and other alloy/intermetallic type carbon composite battery anode materials for lithium-ion batteries with significantly improved battery energy density and cycle life.

As described in this patent disclosure, example embodiments and implementations in accordance with the present technology demonstrate new and facile techniques using cryogenic milling (cryomilling) to fabricate stable and high energy density anode materials. Because a ductile-to-brittle transition occurs for most metals at a low temperature, cryomilling can efficiently reduce the grain/particle size while adding a small amount of well-dispersed nanocarbon to stabilize the resulting nanostructures. In some implementations, for example, the disclosed cryomilling techniques can produce SnSb anodes that demonstrate an initial coulombic efficiency of 83%, averaged efficiency >99.5%, and capacity retention of 90% over 100 cycles. Example implementations described herein employed scanning electron microscopy (SEM), scanning transmission electron microscopy (STEM), and various electrochemical characterizations to investigate this high stability. The refined grain size and well-dispersed carbon matrix can alleviate the volume expansion and prevent particle cracking after cycling. This work demonstrates the successful application of cryomilling to battery electrode materials for the first time and shows much-improved cycle life compared with conventional ball milling.

The subject matter described in this patent document can be implemented in specific ways that provide one or more of the following features.

DETAILED DESCRIPTION

Figures 1A, 1B, 1C:
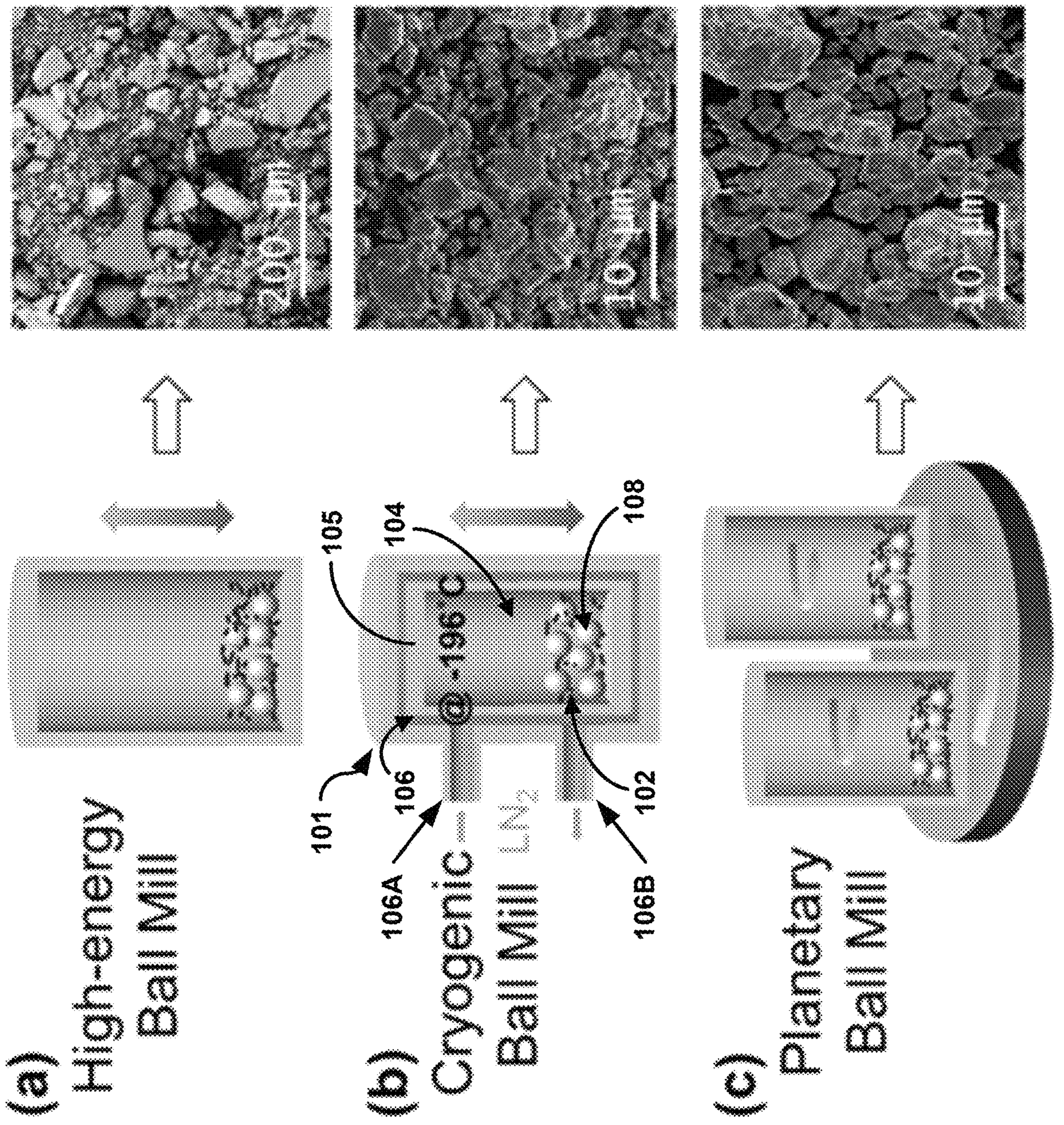
FIGS. 1A-1H show diagrams, images, and data plots depicting morphologies of the mechanical alloyed SnSb—C (tin-antimony with carbon) composite anode fabricated through different techniques, including a cryogenic milling method for fabricating electrode materials in accordance with the present technology.

The development of rechargeable energy storage systems has played a crucial role in the advances in portable electronic devices and electric vehicles. For the past three decades, carbon-based anodes were mainly used due to their good electronic conductivity and cycling stability. However, the theoretical gravimetric and volumetric capacities of graphite are 372 mAh/g and 756 Ah/L, which are major limitations to attain higher energy density batteries. To generate breakthroughs in cell energy density, researchers have studied Li-alloying reactions with metal/semi-metal elements and various intermetallic for the past years. Various strategies, such as nanoporous structures, inactive matrix composites, and carbon composites, are proposed to alleviate the extreme volume change (>200%) during cycling.

To fabricate various carbon composite structures, mechanical alloying via ball milling can be used due to its simplicity. Some have demonstrated the successful synthesis of Sn-M-C composites (M: metal), Si—C composites that showed higher specific capacity compared to graphite anode. However, the volumetric capacity of the composites can be further improved if less carbon is being added.

For example, in 2005, "Nexelion" cell was announced, which utilized an amorphous Sn—Co carbon composite as anode for portable camcorder. It improved the volumetric energy density by 10% compared to $LiCoO_2$/graphite cells. While the composition of the anode material was not disclosed, various research groups carefully studied the batteries and narrowed it down to the composition of Sn:Co:C=3:3:4 (mol) fabricated through high-energy ball milling (HEBM). This corresponds to 10 wt %, or 27 vol %, of graphite added during the ball milling process.

While the added carbon can help to alleviate the volume expansion from the cycling process, it also decreases the full cell volumetric energy density. Due to the heat generated from the ball milling process, decreasing the carbon content using the traditional milling process can increase cold-welding of the metal grains (e.g., metal particles), especially for the low melting temperature metals such as Sn. This can increase both the grain size and the secondary particle size, which are undesirable for battery applications. Therefore, a new processing route is needed to fabricate anode particles with desired micro/nanostructures.

In this disclosure, we demonstrate a new route using cryogenic milling (cryomilling) to fabricate nanostructured alloy anodes. Disclosed are new cryomilling techniques and nanostructured materials, devices, systems and methods of their fabrication using cryomilling techniques.

Cryomilling is a cost-effective manufacturing method that is already widely used in the food industry, polymer powder synthesis, and fabrication of nanostructured alloys. Due to the presence of a ductile-to-brittle transition for many materials at low temperatures, cryomilling can efficiently alleviate the cold-welding and reduce the grain/particle size. Previous studies have also demonstrated the usage of cryomilling to evenly distribute various types of carbon between metal grains for mechanical properties enhancements. To demonstrate the feasibility and the benefits of cryomilling on the fabrication of battery anode materials, SnSb intermetallic was selected as a model system. SnSb has attracted considerable attention due to its high theoretical capacity of 825 mAh/g. Additionally, researchers have found the two-step lithiation reaction of SnSb can create a $Li_3Sb$ matrix structure to buffer the volume expansion and improve the cycling stability. However, bulk micron size SnSb particle can still form cracks upon cycling, resulting in capacity decay upon cycling.

In example implementations described herein, the synthesis of SnSb—C composite using three ball milling methods is compared: (i) high-energy ball milling, (ii) (lower energy) planetary ball milling, and (iii) cryomilling. For example, in the implementations, SnSb—C composite fabricated with HEBM showed severe cold-welding and a particle size >100 μm. The composite made with the planetary ball milling demonstrated poor cycling stability. In contrast, with the cryomilling method, stable and high-energy density SnSb—C anode can be fabricated in one step. Scanning transmission electron microscopy (STEM) and post-cycling SEM revealed that the refined grain size and well-dispersed graphene nanoplatelets are effective to alleviate the volume expansion and prevent particle cracking after cycling. The disclosed cryomilling techniques demonstrate a new method to fabricate practical nanostructured battery electrodes.

EXAMPLE EMBODIMENTS AND IMPLEMENTATIONS

Example embodiments and implementations of the present nanostructured materials technology and cryomilling technology are described below.

In some embodiments in accordance with the present technology, a method for fabricating nanostructured materials for battery electrodes includes a specialized cryogenic milling technique, which is shown, for example, to be an effective method to fabricate a composite material, particularly alloy/intermetallic type carbon composite materials, which can be used for battery anode materials. In some embodiments, for example, the disclosed cryogenic milling technique includes circulating liquid nitrogen outside a ball milling jar to continually cool the milling process. With initial material being micron size metal particles (which can optionally include graphite powder), ball milling under the cryogenic milling method can refine the grain size down to nanocrystalline size, exfoliate bulk graphite powder into multilayer graphene nanoplatelets, and evenly disperse them between the grains. The fabricated electrode structure can effectively suppress particle fracture and decrease capacity decay. The alloy type carbon composite anode material fabricated using this method demonstrate a high volumetric/gravimetric capacity and a good cycle life.

Example materials, processes, characterizations, and results are discussed for some example implementations of the some of the example embodiments described herein.

Material Synthesis. In some example implementations, exemplary SnSb—C composites were prepared by various ball milling routes. Typically, 48.78 wt % Sn (Alfa Aesar, 99.80%, 325 mesh), 50.02 wt % Sb (Alfa Aesar, 99.5%, 200 mesh), and 1.2 wt % graphite (MTI) were used as starting materials. For cryomilling, 1.3 g starting material was placed in a stainless steel jar (50 mL) with five stainless steel balls (5 mm diameter) inside an Argon (Ar) filled glovebox. After the sample is precooled for 15 min, the milling process was performed for 4 h at 25 Hz (1500 $min^{-1}$) (eight cycles of 25 min each with an intermediate cooling of 5 min) using a Retsch Cryomill. The jar is cooled with liquid nitrogen circulation during the precooling and milling process. The milling temperature was constantly monitored with an "Autofill system" from the cryomill machine. For high-energy ball milling, 1.3 g starting material was placed in a stainless steel jar (65 mL) with six stainless steel balls (5 mm diameter) inside an Ar-filled glovebox. The milling process was performed for 4 h at 1200 min−1 (eight cycles of 25 min each with resting of 5 min) using a SPEX-8000D Mixer/Mill at room temperature. For planetary ball milling, 5 g starting material was placed in a yttrium-stabilized zirconium oxide (YSZ) grinding jar (100 mL) with 12 YSZ grinding balls (10 mm diameter) inside an Ar-filled glovebox. The milling process was performed for 8 h at 400 rpm (16 cycles of 25 min each with resting of 5 min) using a Across International PQ-N04 planetary ball mill at room temperature.

For a fair comparison, the processing parameters (ball-to-powder ratio, jar volume/geometry, ball/jar material, milling time, and speed) of cryomilling and HEBM are similar (to the best we can).

Material Characterization. Scanning electron microscopy (SEM) images were taken with a FEI Apreo SEM operated at 5 kV. To characterize the crystal structure of the synthesized SnSb—C composite, X-ray powder diffraction (XRD) was conducted using a Bruker D2 Phaser (Cu Kα radiation, λ=1.5406 Å) with a scanning rate of 0.5°/min. The grain size and strain were calculated using the Williamson-Hall method. N2 porosimetry was conducted with a Micrometritics TriStar II 3020. The sample pore volume was calculated from the adsorption branch of the isotherm using the Braet-Joyner-Halenda (BJH) model. Raman spectroscopy was taken using a Renishaw Raman with a 633 nm laser. The transmission electron microscopy sample was fabricated with a dual-beam focused ion beam (FIB)/SEM system using a FEI Scios. The microstructures and elemental distribution of the cryomilled composite were further studied with aberration-corrected scanning transmission electron microscopy (AC STEM) using a JEOL JEM-300CF STEM microscope operated at 300 kV with double correctors and a dual large-angle energy-dispersive X-ray spectroscopy (EDS) detector. The STEM and EDS data processing was performed with DigitalMicrograph (DM). For postcycling particle morphology SEM characterization, the electrode after electrochemical cycling was disassembled using an MTI hydraulic crimper equipped with disassembling die inside an Ar-filled glovebox. The obtained electrode was rinsed with diethyl carbonate (DEC) solvent to remove the residual electrolyte, and then dried inside the glovebox antechamber under vacuum for 30 min. To ensure air-free transfer into the SEM chamber, the sample was sealed inside a QuickLoader (FEI) in the glovebox and directly loaded into the SEM chamber.

Electrochemical Characterization. Each type of ball-milled SnSb—C was mixed with carbon fiber (pyrolytically stripped, >98% carbon basis, D×L=100 nm×20 −200 μm) and carboxymethyl cellulose (CMC, MTI Corp) in water at a mass ratio of 8:1:1 using a Thinky mixer (ARE-310) for 2 h at 2000 rpm. The resulting homogeneous slurry was casted on a copper foil (9 μm thick, MTI Corp) using a doctor blade and an automatic tape casting coater at a constant traverse speed of 10 mm/s. The casted tape was first dried in air for 12 h, and then dried in a vacuum oven at 80° C. for 12 h. After drying, the electrode was then punched into 11 mm discs and weighed individually. The average active material (SnSb—C composite) loading was 1.50 mg/cm$^2$. 2032-type coin cells were assembled with the Li metal disc as counter/reference electrode and Celgard 2320 polypropylene membrane as a separator. The electrolyte consists of 1 M LiPF6 in a 1:1 ethylene carbonate/diethyl carbonate solvent (LP40, Sigma-Aldrich) with 5 vol % fluorinated ethylene carbonate (FEC, Sigma-Aldrich). Galvanostatic cycling was conducted using a Lanhe battery cycler in the potential range of 0.05-1.5 V vs Li+/Li at various current rates (listed in figures). The gravimetric capacity was calculated based on the loading of the active material (SnSb—C composite).

Figure 8:
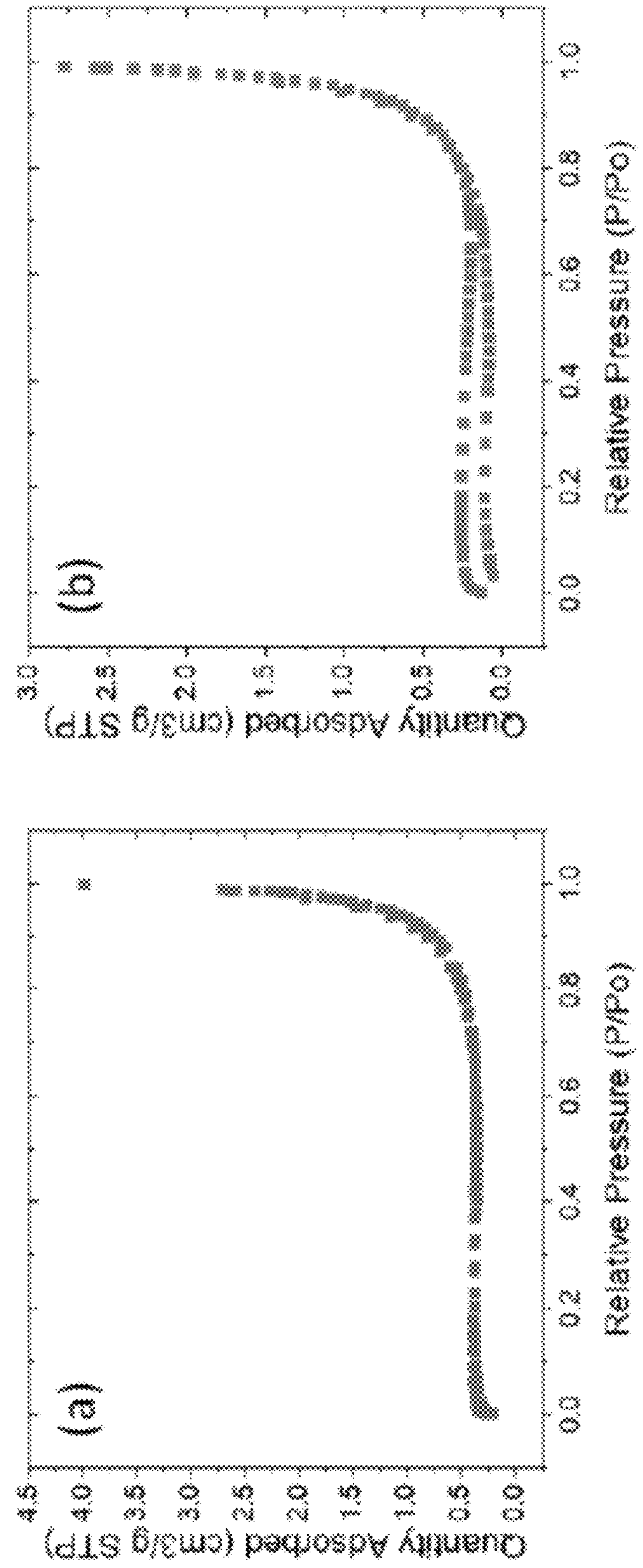
FIG. 8 shows data plots depicting porosity properties of the example cryomilled and planetary ball milled SnSb—C composite anodes.

Porosity Measurements The cryomilled and planetary ball milled sample porosity was characterized with nitrogen porosimetry. The N2 adsorption-desorption curves in FIG. 8, plots (a) and (b), show type II isotherm, which indicates both samples are mostly non-porous. Using the Barrett-Joyner-Halenda (BJH) method, the cumulative pore volume of the cryomilled and planetary ball milled sample were calculated to be 0.0044 cm$^3$/g and 0.0058 cm$^3$/g, respectively, which also match the observed mostly dense particles from the SEM images for both samples. This shows that the cycling stability is not likely affected by the sample porosity.

FIGS. 1A-1C show diagrams and data plots depicting morphologies of the mechanical alloyed SnSb—C composite anode fabricated through (a) high-energy ball mill (FIG. 1A), (b) cryogenic ball mill (FIG. 1B), and (c) planetary ball mill (FIG. 1C), including an X-ray diffraction comparison of SnSb—C composite anode synthesized through different methods.

In some example embodiments of a cryomilling process in accordance with the present technology, liquid nitrogen ($LN_2$) is used and circulated outside a ball milling apparatus to continually cryo-cool the milling process (FIG. 1B). As shown in the illustrative diagram of FIG. 1B, a cryogenic milling apparatus 101 includes a chamber 104 enclosable by an outside wall 105 of the chamber 104, within which an initial material 102 can be deposited (e.g., through a sealable opening, not shown) for cryogenic milling, e.g., using ball milling balls 108 and via circulating $LN_2$. The cryogenic milling apparatus 101 includes a cooling chamber 106 that surrounds the main chamber 104. In some example embodiments, the cooling chamber 106 substantially surrounds the entire chamber 104; and in some example embodiments, the cooling chamber 106 surrounds a portion of the chamber 104, e.g., including a large portion of the chamber, such as the majority or all of the lower portion of the chamber. The cryogenic milling apparatus 101 includes an inlet 106A and an outlet 106B, e.g., where each can include a port that facilitates a connection to an external passage, such as a tube. In some implementations of the cryomilling process, for example, $LN_2$ circulation can include adding amounts of $LN_2$ to the cooling chamber 106 through an inlet tube (e.g., the upper tube shown in FIG. 1B) while allowing excess $LN_2$ to exit via an outlet tube (e.g., the lower tube shown in FIG. 1B) while monitoring the temperature of the chamber 104.

Figure 1D:
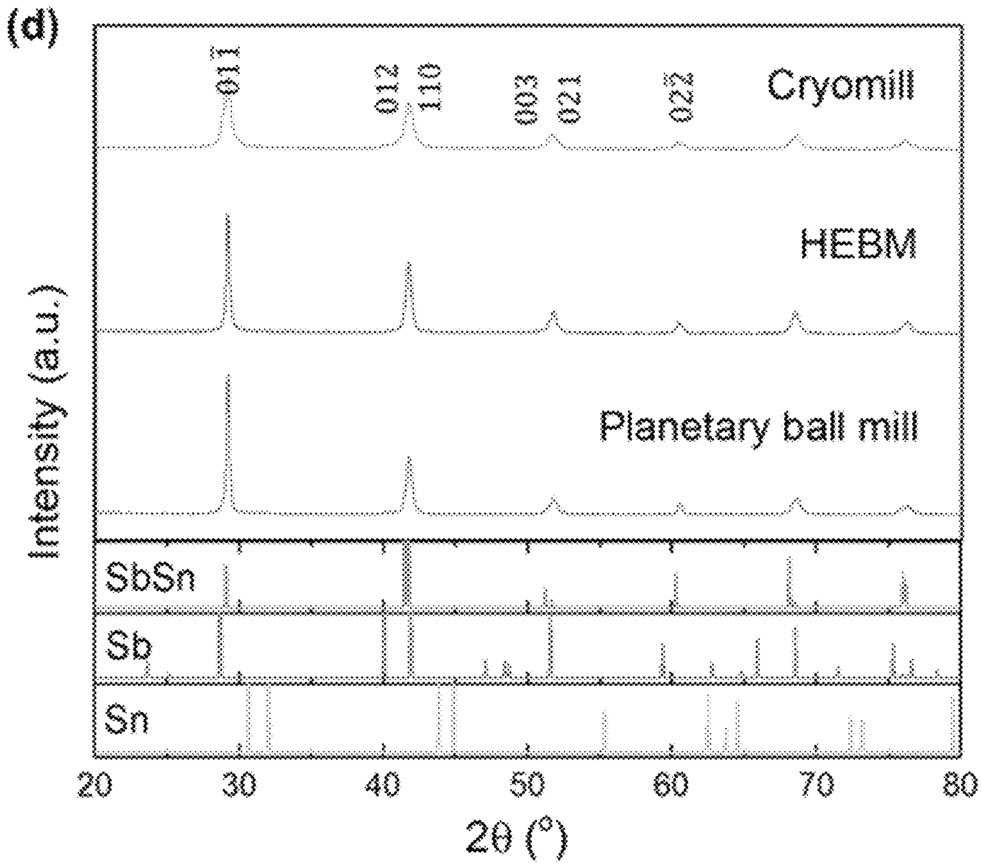
Figure 1E:
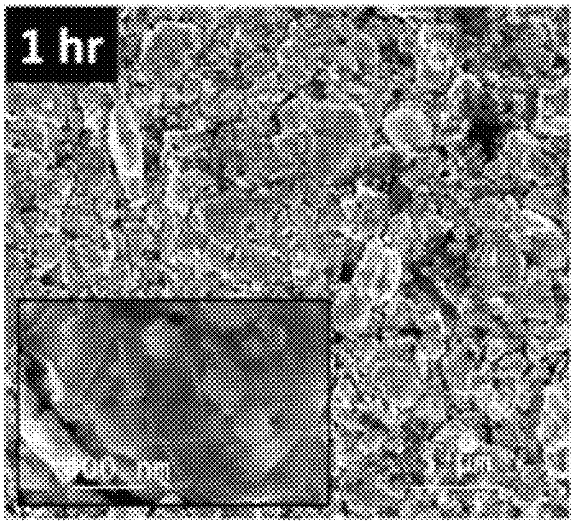
Figure 1F:
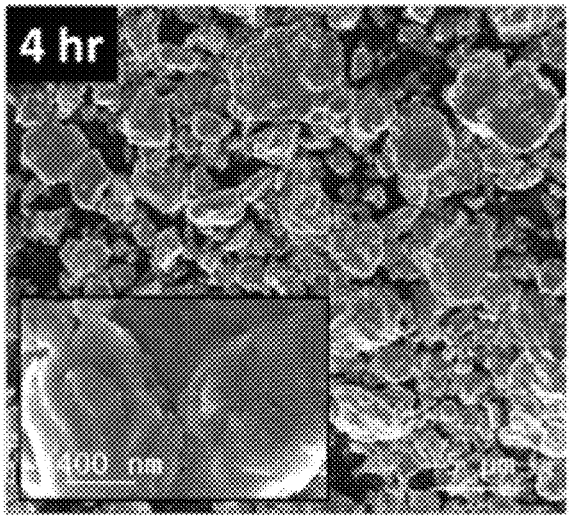
Figure 1H:
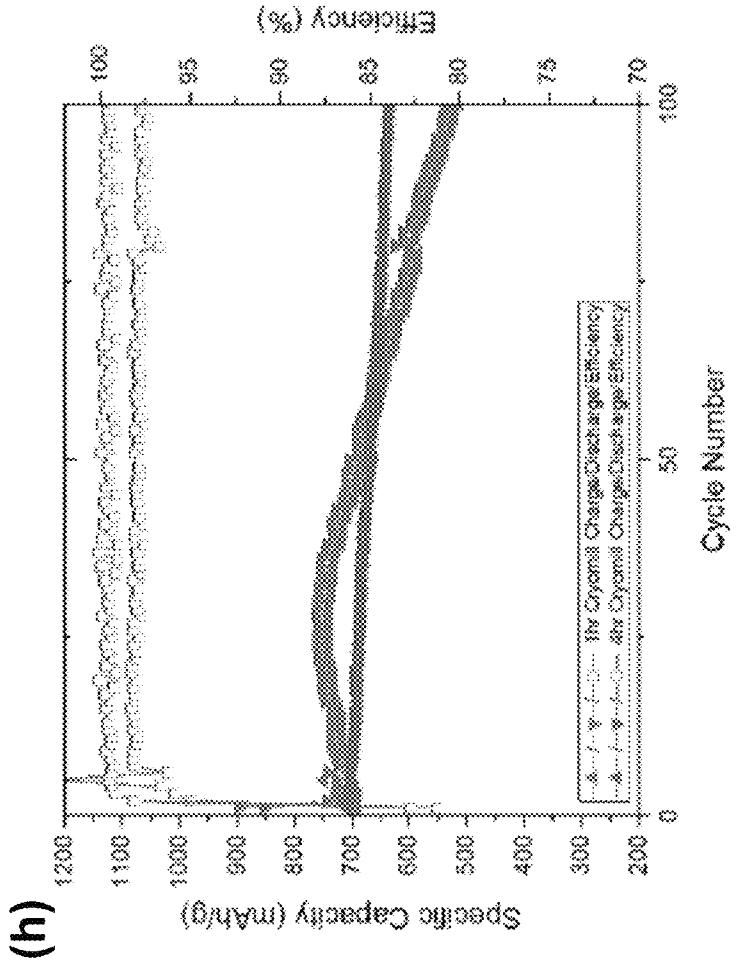
Figure 1G:
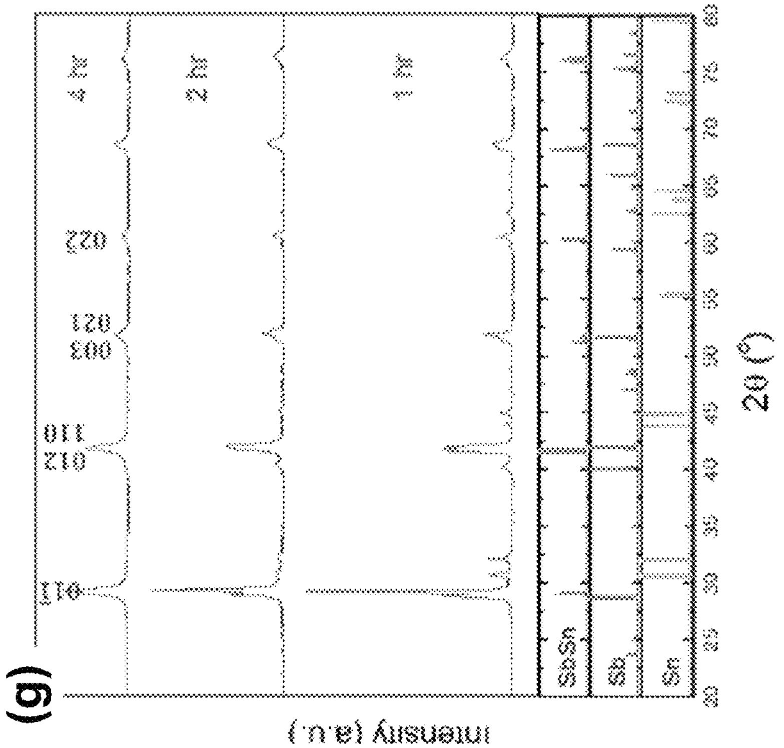

This example process can be viewed as a high-energy shaker mill with automatic $LN_2$ cooling. In some implementations, for example, the cryogenic milling apparatus 101 can include a ball mill jar. In some example implementations performed using the ball mill jar for cryogenic processing, the ball mill jar was cooled to −196° C. before the milling process, and 5 min intermediate cooling was carried out after 25 min of ball milling to ensure the cryogenic processing temperature. The cryomilling process was first optimized with various milling times. Sn and Sb particles were added in 1:1 (mol) with 1.2 wt. % graphite. The starting material was kept the same for all ball milling process. After 1 h of cryomilling (e.g., 2×25 min milling with 5 min intermediate cooling), unmixed graphite could still be observed in the SEM images, indicating insufficient mixing (FIG. 1E after 1 h of cryomilling compared to FIG. 1F after 4h of cryomilling). Sn (ICSD-106072) and Sb (ICSD-64695) phases were also seen in the product based on the X-ray diffraction (XRD) (FIG. 1G), so longer processing time was required. When the milling time increased to 4 h, for example, flake-like particles with a diameter <7 μm could be observed based on the SEM image (FIG. 2, panel (a)). In addition, there were no graphite flakes could be found, indicating most graphite was exfoliated and mixed between the grains. The diffraction patterns of the 4 h cryomilled sample could be indexed with SnSb (ICSD-154085) in R3‾m space group. The diffraction peaks correspond to Sn and Sb mostly disappeared after 4 h of cryomilling, and the dominant SnSb diffraction peaks also became broader. This indicates cryomilling can be used to synthesize fine-grained SnSb particles. The cycling performance of SnSb—C composite made with 1 h and 4 h cryomilling was compared as shown in FIG. 1H. The 4 h cryomilled composites showed higher coulombic efficiency (99.6% vs. 97.5%) and cycling stability, which likely benefit from the smaller grain size, formation of SnSb phase, and evenly distributed carbon matrix.

Figure 2:
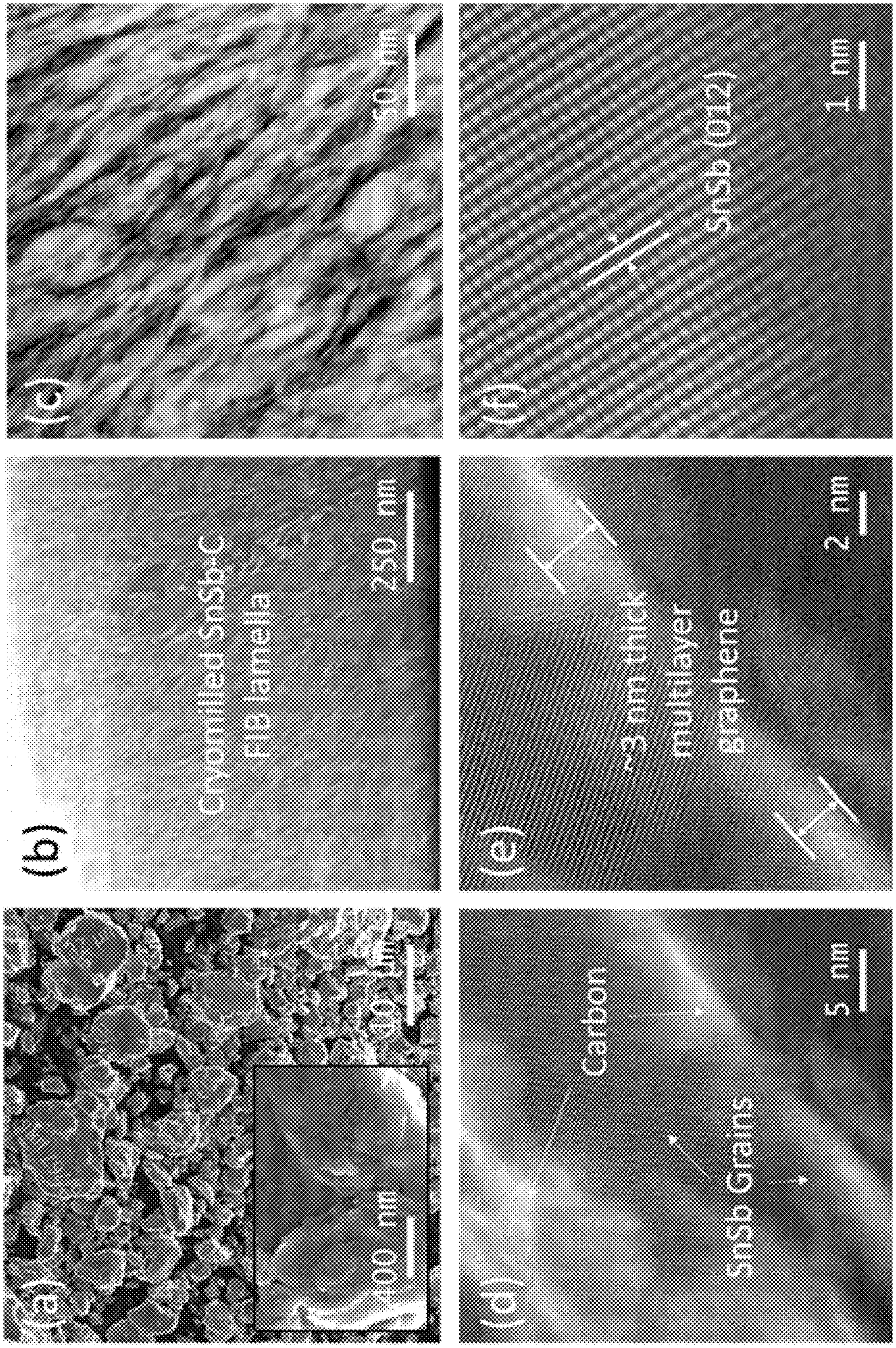
FIG. 2 shows SEM and TEM micrographs of the example cryomilled SnSb—C composite anode.
Figure 2:
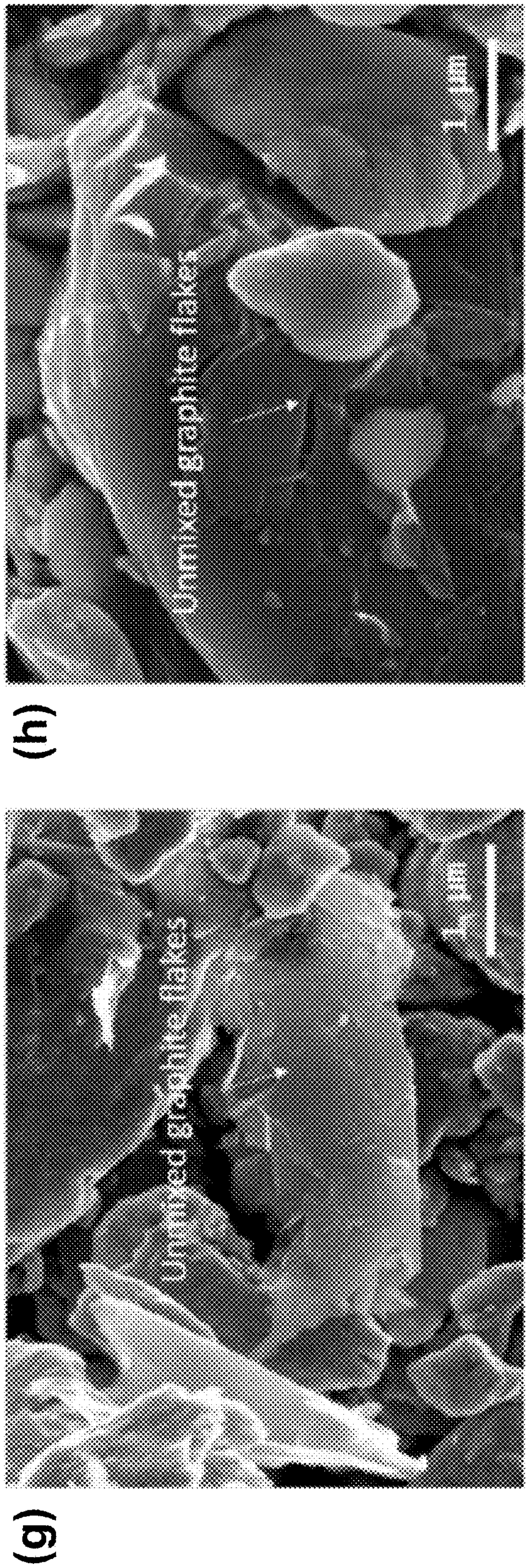

FIG. 2 shows panels of SEM and TEM micrographs of the example cryomilled SnSb—C composite anode. Specifically, FIG. 2 panel (a) shows a SEM image of the cryomilled SnSb—C. FIG. 2 panel (b) shows a low-mag bright field, and FIG. 2 panel (c) shows a high-mag STEM HAADF images revealing nanostructures in the cryomilled composite. FIG. 2 panels (d), (e) show high-mag STEM bright-field images showing graphene nanoplatelets between the grains. The bright-field images (FIGS. 2(*d*) and (*e*)) showed that the majority of the SnSb grains are elongated and have a width of around 20 nm. In addition, ~3 nm thick multilayer graphene layers were observed between the grains. This indicated that cryomilling could exfoliate bulk graphite powder into nanometer-thick multilayer graphene nanoplatelets and disperse this nanographite homogeneously within the SnSb grains. Based on FIG. 2 panel (c), the averaged carbon thickness with the cryomilled sample was 3.62±2.01 nm, with the maximum measured carbon thickness being 11.04 nm. FIG. 2 panel (f) shows an atomic resolution STEM HAADF image of the SnSb grains.

For example, for a fair comparison, HEBM and planetary ball milling were carried out with similar processing parameters (see, "Materials Synthesis" section). The resulting morphology and XRD comparison of SnSb—C composites are shown in FIG. 1D. The ball milling process resulted in the formation of SnSb. After 4 h of HEBM (e.g., 8×25 min milling with 5 min intermediate rest), large particles with more than 100 μm diameters could be commonly observed (FIG. 1A), e.g., indicating severe cold-welding effects during the milling process. Since planetary ball milling has lower mixing energy, 8 h (e.g., 16×25 min with 5 min intermediate rest) was required to mechanically alloy SnSb phase. The lower mixing energy also alleviated the cold-welding effect and resulted in a smaller particle diameter <7 μm (FIG. 1C). However, the lower milling energy also results in uneven mixing of graphite with the metal powder. In FIG. 2 panels (g) and (h), graphite flakes could still be observed after an 8 h planetary ball milling process. Benefiting from the $LN_2$ cooled shaker mill, 4 hr of cryomilling produced <7 μm diameter particles with no obvious graphite observed. Moreover, the cryomilled powder showed broader diffraction peaks, which indicates a finer grain size.

To characterize the underlying nanostructures of the milled powder, a focused ion beam (FIB) was used to lift-out a lamella sample from the powder that revealed the cross-section for STEM characterization. The high-angle annular dark field (HAADF) images (FIG. 2, panel (c)) showed mostly fiber-like fine-grained SnSb (bright region) reinforced with the carbon structure (dark region). After zooming in, the bright-field images (FIG. 2 panels (d) and (e)) showed nanocrystalline SnSb grains with diameter<50 nm; in addition, −3 nm thick multilayer graphene nanoplatelets were observed between the grains. This indicated that cryomilling could exfoliate bulk graphite powder into nanometer-thick graphene nanoplatelets and dispersed it evenly within the SnSb grains. The atomic resolution HAADF image (FIG. 2 panel (f)) showed the interplanar spacing of one of the grains was measured to be 0.217 nm, which corresponds to the orientation of (012) atom plane of SnSb. The distribution of SnSb and carbon was further confirmed with STEM EDS mapping, as shown in FIG. 3.

Figure 3A:
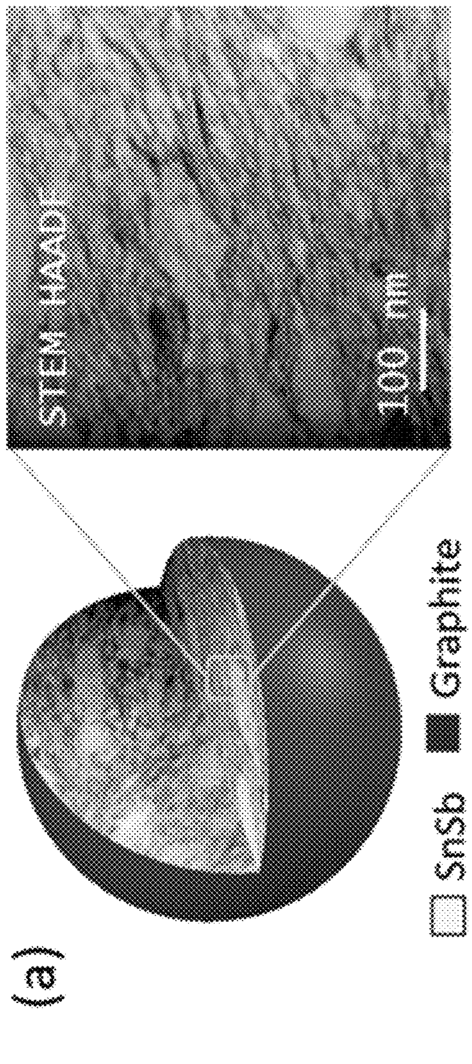
FIGS. 3A-3E show an illustrative diagram with STEM image, EDS elemental maps, and an EDS spectrum of the example cryomilled SnSb—C composite anode.
Figure 3B:
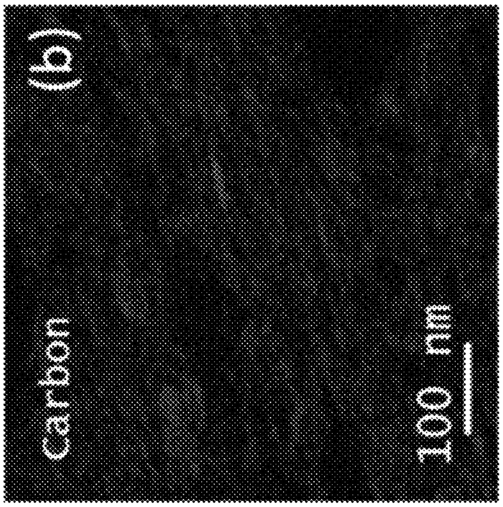
Figure 3C:
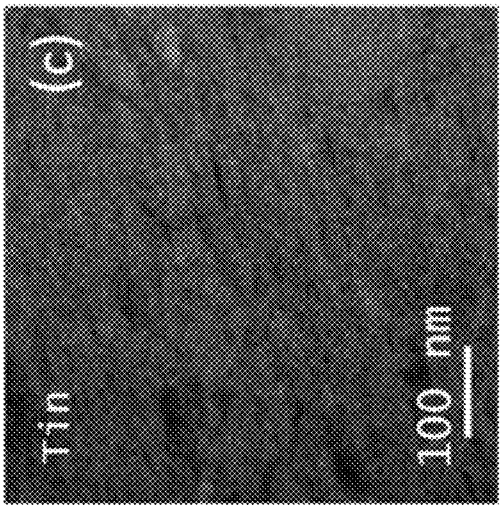
Figure 3D:
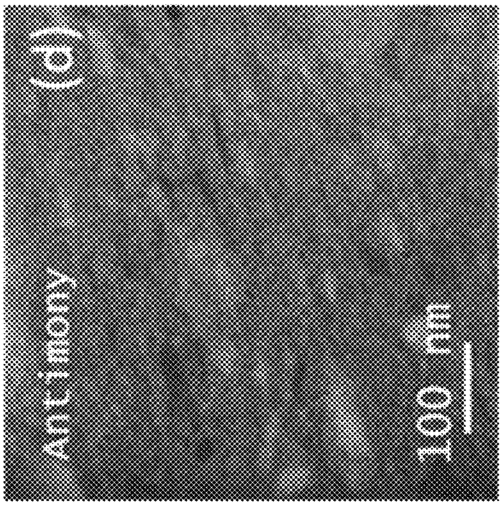

FIGS. 3A-3E show an illustrative diagram with STEM image and EDS elemental maps and a data plot depicting an example cryomilled SnSb—C composite anode. Specifically, FIG. 3A shows a schematic diagram and a STEM HAADF image of a cryomilled SnSb—C composite particle and the region where the EDS scan was performed. An EDS elemental map of carbon, tin, and antimony are shown in FIGS. 3B, 3C, and 3D, respectively.

Figure 3E:
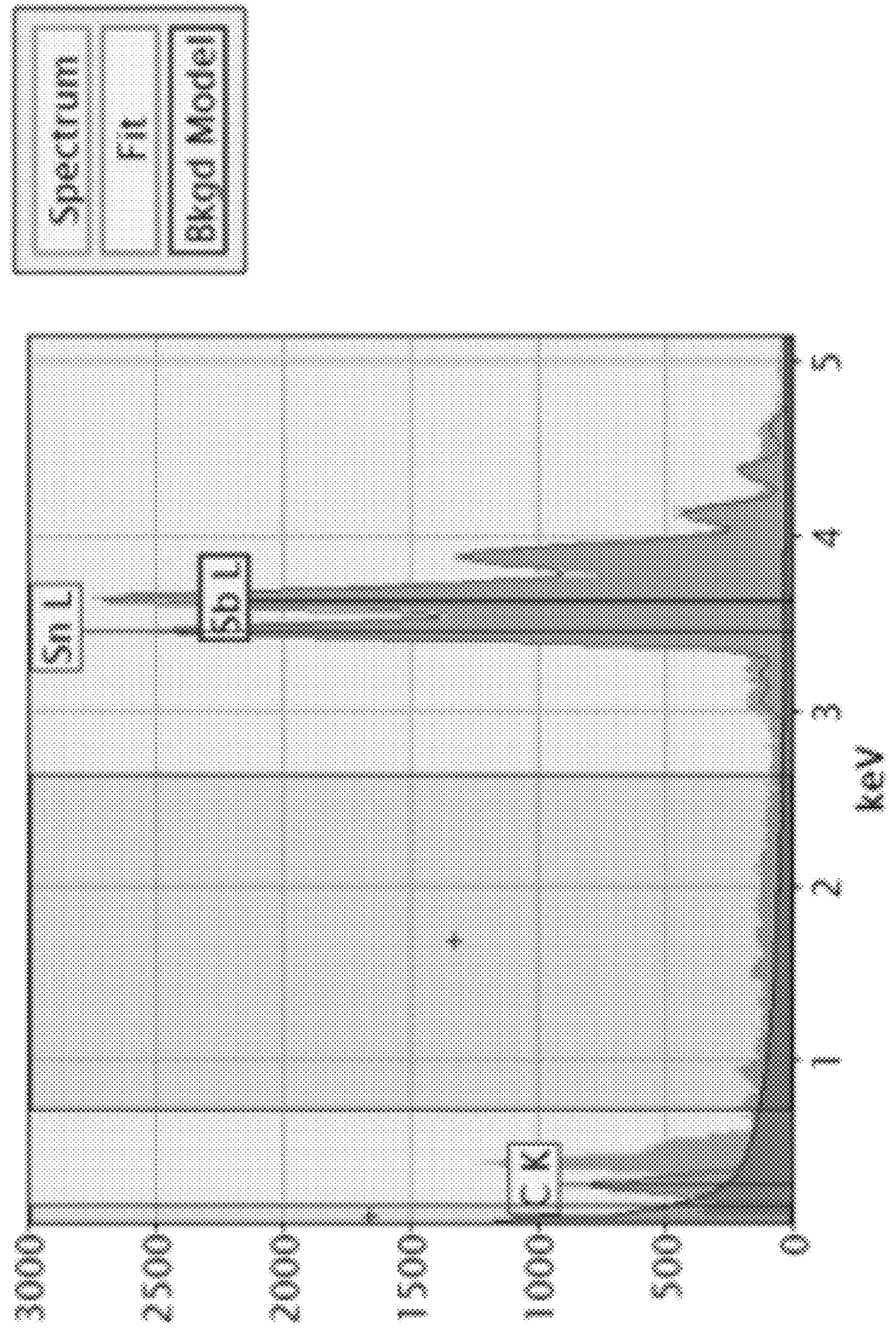

Sn and Sb are relatively evenly distributed (Sb-rich region still exists) in the area where they showed bright contrast in the FIG. 3A HAADF image. The carbon EDS mapping (FIG. 3B) further confirms that the dark region in the HAADF image corresponds to the carbon matrix structure. The EDS spectrum fitting in FIG. 3E showed that there are 4.0 at. % C, 51.2 at. % Sn, and 44.8 at. % Sb, which can be well correlated to the designed composition.

This underlying nanostructure showed the feasibility of using cryomill to fabricate high energy density carbon composite alloy anodes. It should be noted that for cryomilled SnSb—C composite, there still exists regions with higher Sb content (FIG. 3D) and inhomogeneous grain size (FIG. 2, panel (b)), which are indications of insufficient mixing. Further processing parameter fine-tuning is ongoing to optimize the structure homogeneity.

Figure 4:
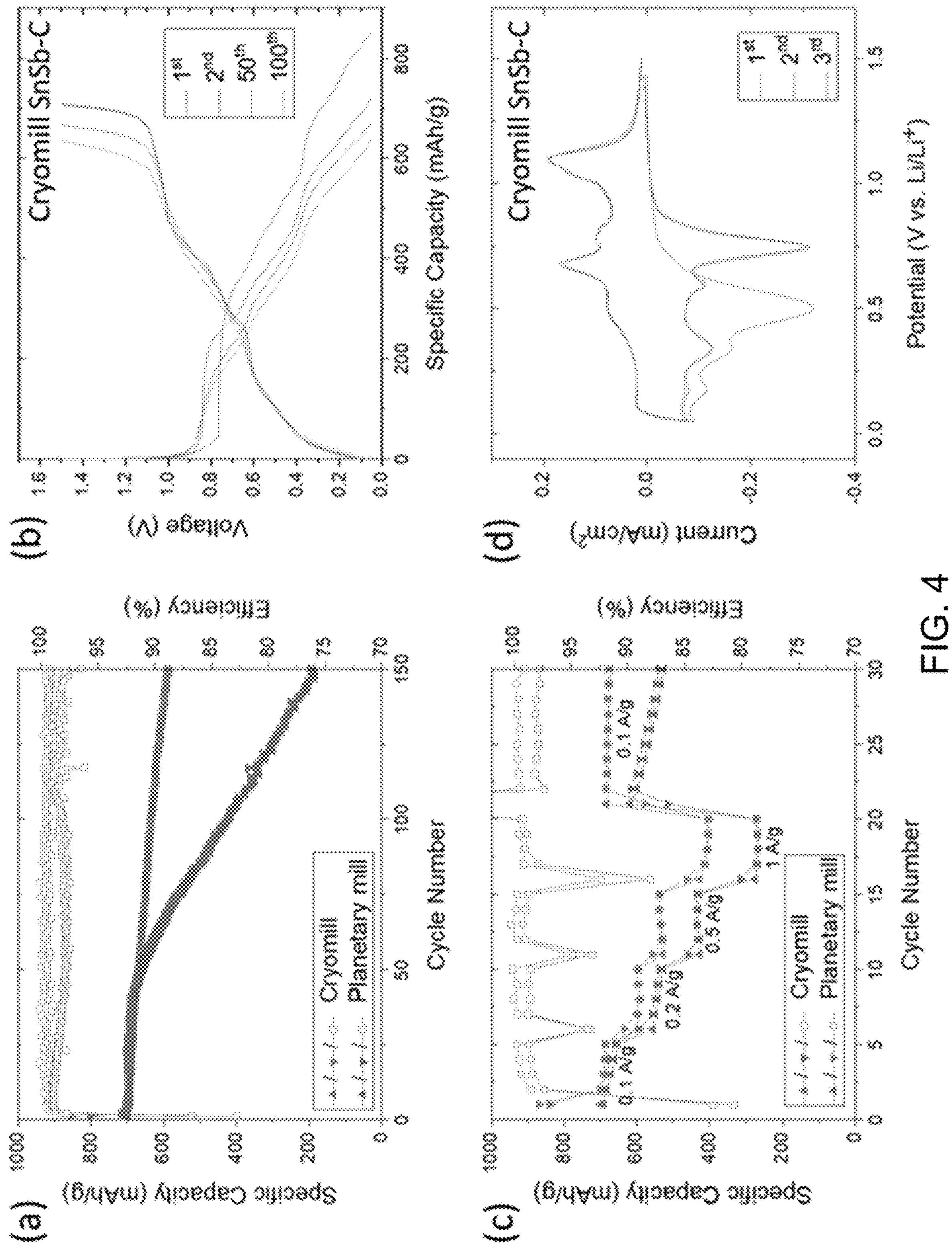
FIG. 4 shows data plots depicting example electrochemical characterizations of the example cryomilled and planetary ball milled SnSb—C composite anodes.

The electrochemical performance of the SnSb—C composites synthesized with planetary ball milling and cryomilling were compared using galvanostatic cycling. The particle size of HEBM SnSb—C composite was greater than 100 μm; therefore, poor electrochemical performance was expected, in part due to the inhomogeneous slurry mixing and tape casting. Additionally, large particles are known to easily fracture during cycling; they can even penetrate the separator and cause battery shorting. The cryomilling and planetary ball milled samples both have initial charge capacity of 708 mAh/g and 697 mAh/g, respectively (FIG. 4, data plot (b)), which is lower than the SnSb theoretical capacity (e.g., 825 mAh/g). This could be attributed to the increased voltage cutoff to prevent lithium plating and the addition of carbon content. The cryomilled SnSb—C showed a distinct voltage plateau during cycling (FIG. 4, data plot (b)), indicating that most of the charge storage happens through alloying reaction instead of surface charge adsorption of pseudo-capacitance. FIG. 4, data plot (a) shows that the planetary milled SnSb—C composites lost 73% of capacity after 150 cycles. The Coulombic efficiency continued to fall for the first 50 cycles from 98.8% to 97.5%, which suggests continued side reactions with the electrolyte upon cycling. In comparison, the cryomilled SnSb—C composite showed 84% capacity retention after 150 cycles with averaged Coulombic efficiency of 99.6±0.3% (FIG. 4, data plot (a)).

FIG. 4 shows data plots depicting example electrochemical characterizations of the example cryomilled and planetary ball milled SnSb—C composite anodes. Data plot (a) of FIG. 4 shows the cycling performance comparison of the cryomilled and planetary ball milled SnSb—C composite anode at 100 mA/g between 0.05V-1.5V. Data plot (b) of FIG. 4 shows the voltage profile of the cryomilled SnSb—C composite anode at 1st, 2nd, 50th, and 100th cycle at 100 mA/g. Data plot (c) of FIG. 4 shows the rate performance comparison of cryomilled and planetary ball milled samples. Data plot (d) of FIG. 4 shows the cyclic voltammetry of the cryomilled SnSb—C composite anode at 0.1 mV/s between 0.05 and 1.5V.

The rate capability of the cryomilled and planetary ball milled samples is shown in FIG. 4, data plot (c). When the cycling current is increased to 200 mA/g, 500 mA/g, and 1 A/g, the planetary ball milled composite only retained 38% of its capacity at 1A/g and suffered from continuous decay after the cycling current resumed back to 100 mA/g, indicating possible electrode microstructure damage after high rate cycling.

To further evaluate the cryomilled SnSb—C electrode kinetics, cyclic voltammetry (CV) was also conducted (FIG. 4, data plot (d)), which was well correlated to the galvanostatic cycling voltage curve. The first CV cycle showed a reduction peak at 0.5V, which can be assigned to the formation of $Li_3Sb$ phase and solid electrolyte interface (SEI) layer. The remaining reduction peaks from 0.4V to 0.05V could be labeled with the formation of Li—Sn intermetallic including $Li_2Sn_5$, LiSn and $Li_{4.4}Sn$. At cycle 2 and 3, the redox peak current density is mostly unchanged, thereby indicating good cycling stability of the cryomilled SnSb—C composite electrode.

Figure 5:
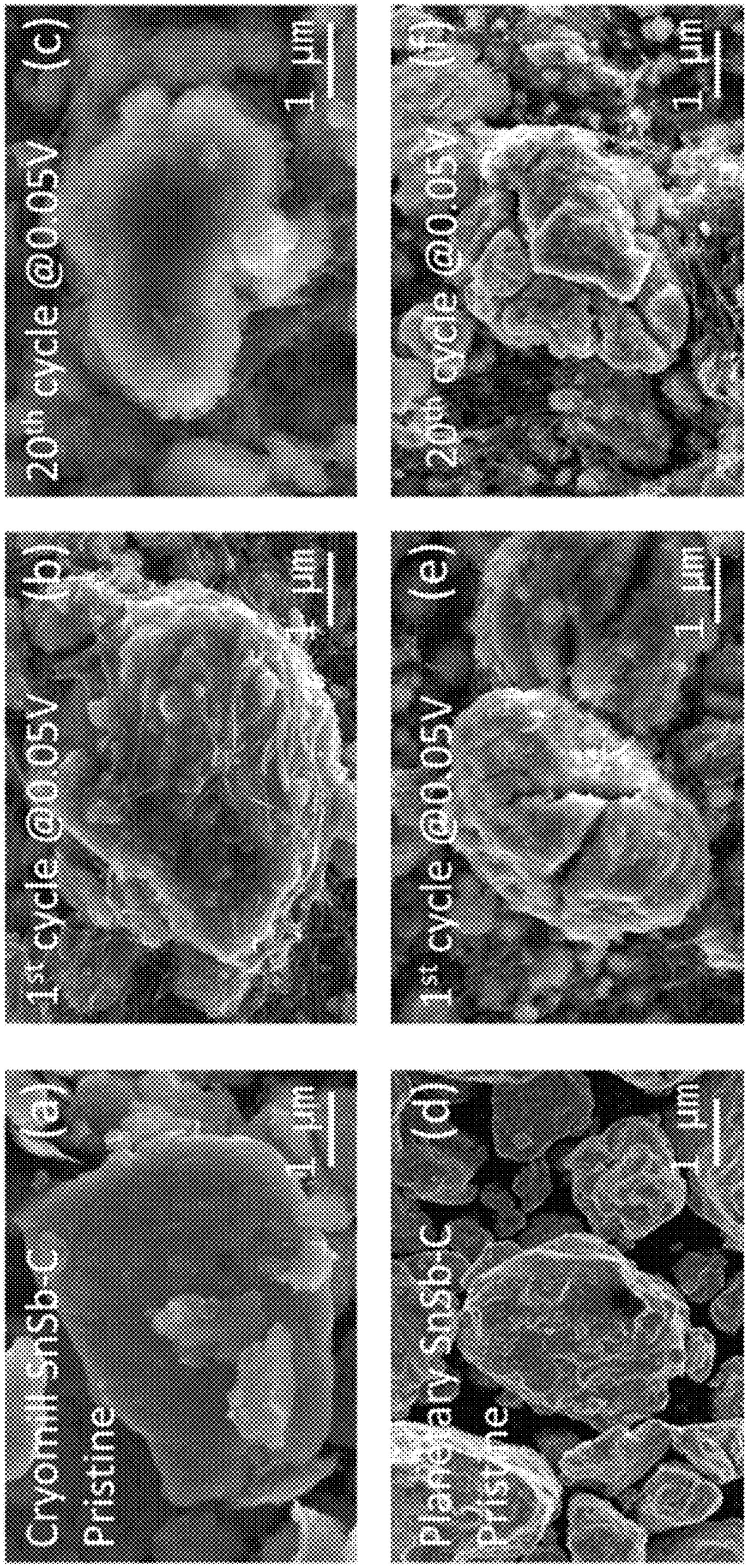
FIGS. 5-7 show images comparing the changes in morphologies upon cycling for example cryomilled and planetary ball milled SnSb—C composite anodes.
Figure 6:
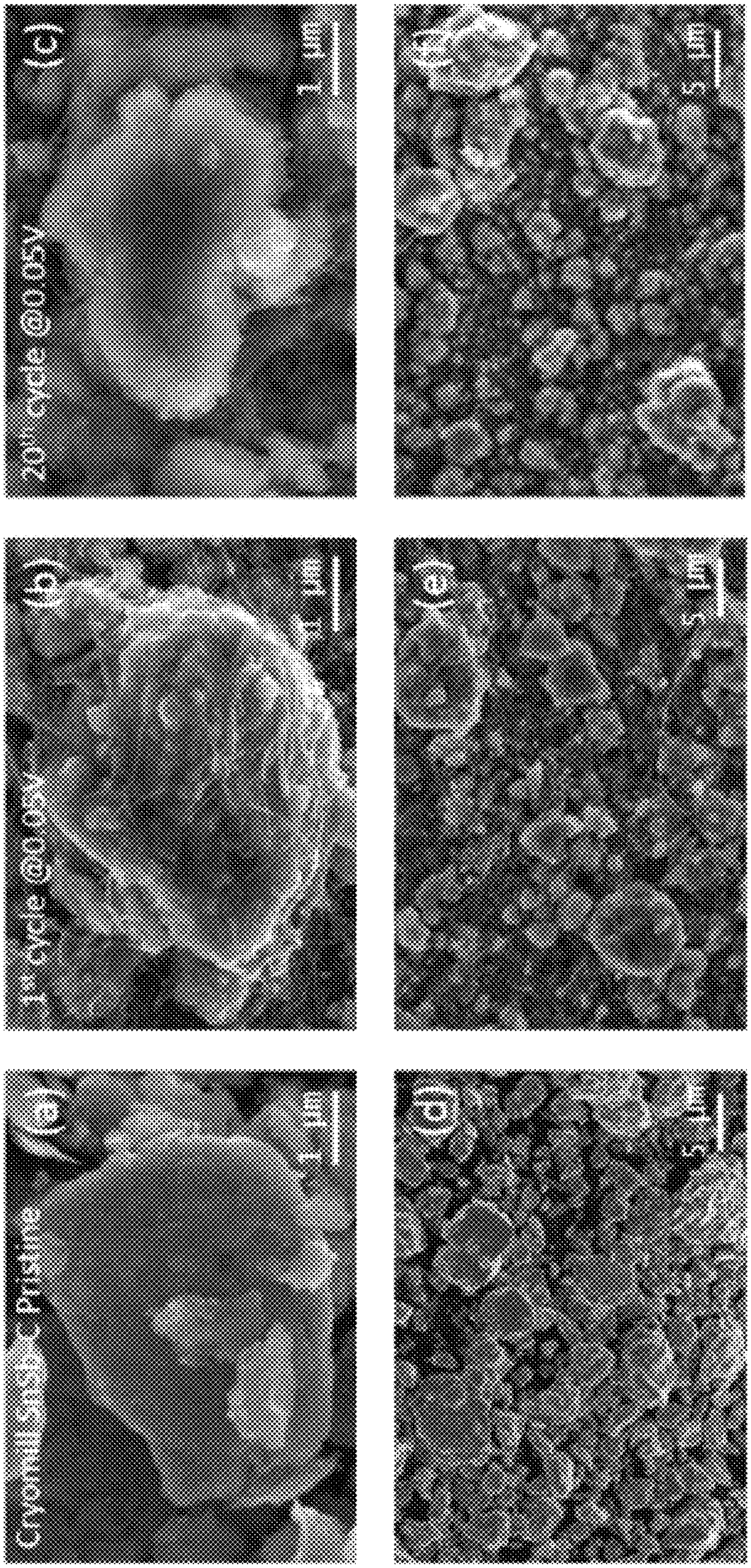
Figure 7:
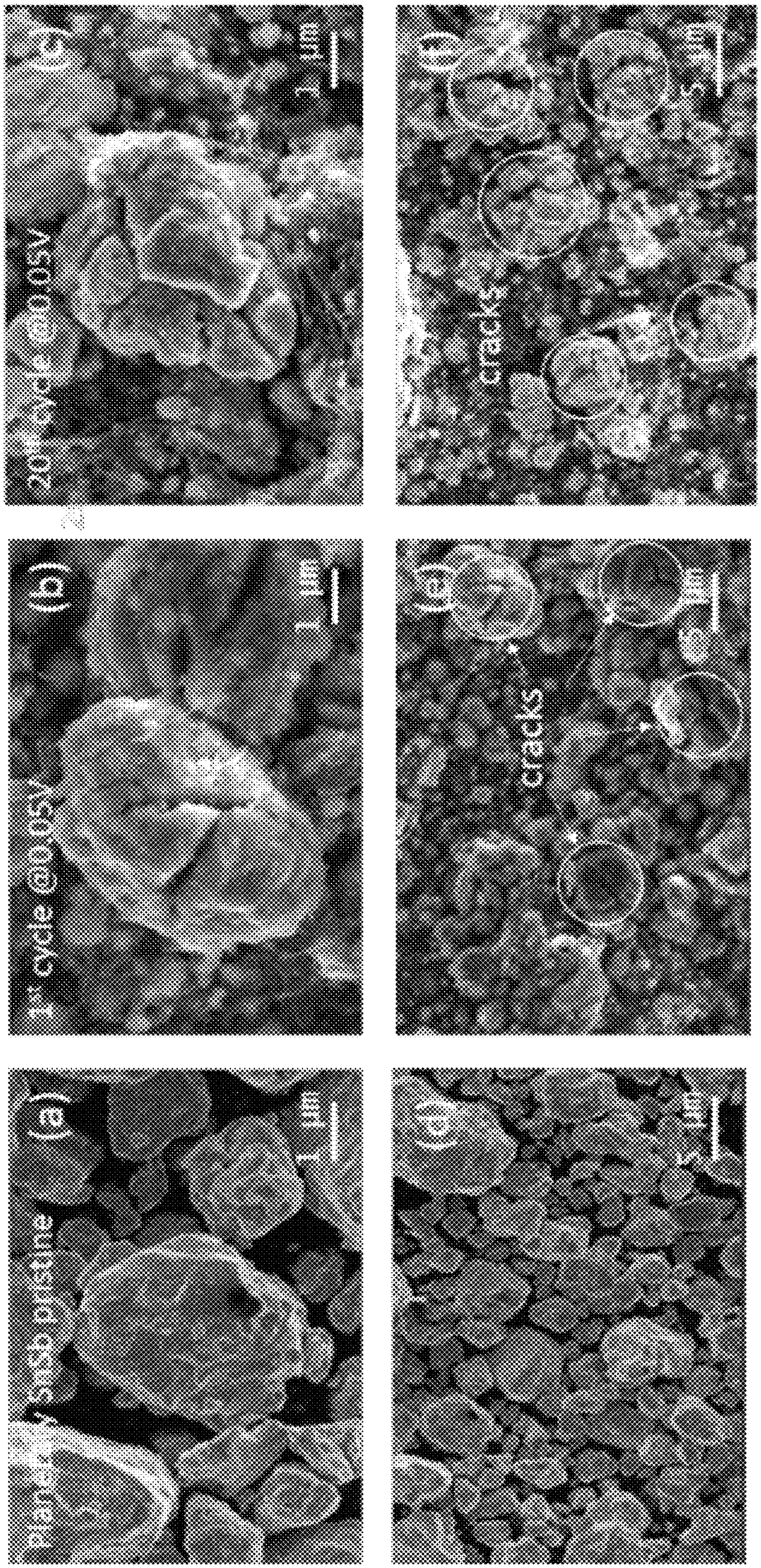

FIGS. 5-7 show images comparing the changes in morphologies upon cycling cryomilled and planetary ball milled SnSb—C composite anodes. Image (a) of FIG. 5 shows pristine cryomilled SnSb—C composite anode. Images (b) and (c) show ex-situ SEM of cryomilled SnSb—C after (b) initial lithiation and (c) 20 cycles. Image (d) shows pristine planetary ball milled SnSb—C composite anode. In images (e) and (f) include an ex-situ SEM image of planetary ball milled SnSb—C after (e) initial lithiation and (f) 20 cycles are shown. Low-mag SEM images can be found in FIG. 6 and FIG. 7.

To evaluate the effectiveness of the nanostructure on alleviating cracks formation, for example, the morphology of the composites was evaluated using SEM for the first lithiation and after 20 cycles (FIG. 5). After the initial lithiation, nanometer-sized clumps could be observed on all the powder surface and minor cracks could be found for the large particles (e.g., >5 μm) in the planetary ball milled sample shown in FIG. 5, image (e) and FIG. 7, image (e). After $20^{th}$ cycles, severe cracks and complete particle fracture were commonly found throughout the electrode based on the single-particle SEM (FIG. 5, image (f)) and low-magnification SEM (FIG. 7, image (f)). Severe particle fracture can cause excessive side reaction with electrolyte, which explains the observed low Coulombic efficiency and fast capacity fade for the planetary ball milled composite. For the cryomilled sample, surface bulge was observed on particle after initial lithiation, indicating volume expansion of the alloying reaction; however, no obvious crack could be easily spotted in the SEM images (FIG. 5, image (b) and FIG. 6, image (e)), which demonstrates the effectiveness of the carbon matrix structure and the refined grain size. When the cryomilled composite was cycled for 20 cycles, the particle surface became noticeably rough (FIG. 5, image (c)) and some minor surface cracks could be spotted for the large particles (FIG. 6, image (f)). For example, this could be caused by the minor elemental and grain size inhomogeneity found through STEM characterization. Nevertheless, most particles still maintain their shapes and no complete fracture could be observed. This improved post-cycling morphology further showed the largely improved stability of the cryomilled SnSb—C composite.

This improved postcycling morphology was consistent with the improved electrochemical stability of the cryomilled SnSb—C composite. As previous reviews have pointed out, the volumetric energy density of many alloy type carbon composite anodes can be limited due to the large volume of low-density carbon and internal porosity. The present technology demonstrates that cryomilling can be utilized for facile fabrication of high-energy density anodes. The cryomilled SnSb—C composite is mostly nonporous (0.0044 $cm^3/g$ porosity), and it has a gravimetric capacity of 669 mAh/g after 50 cycles at 100 mA/g. For example, using the density of graphite (2.2 $g/cm^3$) and fully lithiated SnSb (2.78 $g/cm^3$), the composite demonstrates a volumetric capacity $q^-_R$ of 1842 Ah/L, which shows significant improvement compared to a graphite anode (756 Ah/L). For energy storage applications in portable electronics and electric vehicles, it is more important to compare the improvements on full-cell energy density. Active material porosity, average voltage, irreversible capacity, and Coulombic efficiency all have significant impacts on cell energy density and performance.

Notably, many alloy type carbon composite anodes volumetric energy density can be limited due to the large volume of low-density carbon and internal porosity. This work, for example, demonstrates that cryomilling can be utilized for facile fabrication of high energy density anodes. The cryomilled SnSb—C composite is mostly non-porous (e.g., 0.0044 $cm^3/g$ porosity), and it has a gravimetric capacity of 669 mAh/g after 50 cycles (see, e.g., data in FIG. 8). Using the density of graphite (2.2 $g/cm^3$) and fully lithiated SnSb (2.78 $g/cm^3$), the composite demonstrates a volumetric capacity $$q_R^-$$

of 1842 Ah/L, which shows significant improvement compare to graphite anode (756 Ah/L). For energy storage applications in portable electronics and electric vehicles, it is more important to compare the improvements on full cell energy density. Active material porosity, average voltage, irreversible capacity, and coulombic efficiency all have significant impacts on cell energy density and performance.

By adopting a cell-based model, for example, the stack energy can be calculated by the assumption that the anode electrode contains 70 vol. % SnSb—C, and the anode irreversible capacity match that of the cathode. $LiCoO_2$ was selected as the baseline cathode that has a reversible volumetric capacity $$q_R^+$$

of 530 Ah/L, and an average voltage $$V_{avg}^+$$

of 3.9 V. The N/P ratio (capacity ratio of the negative and positive electrode) was set to be 1.1. Cryomilled SnSb—C composite has an average voltage $$V_{avg}^-$$

of 0.75 V. Using these data and assumptions, the stack energy UR can be calculated to be 855 Wh/L based on the following equation, for example:

$$U_R = \frac{2q_R^+ t^+}{t_{cc}^+ + t_{cc}^- + 2t_s + 2t^+\left[1 + \frac{q_R^+}{q_R^-}\left(\frac{N}{P}\right)\right]}\left(V_{avg}^+ - V_{avg}^-\right) \quad (1)$$

where the cathode current collector thickness $t_{cc}^{+}$ and anode current collector thickness $t_{cc}^{-}$ were set to 15 μm, the separator thickness $t_s$ was set to 20 μm, and the cathode electrode thickness $t^+$ was set to 55 Based on this full cell model, an 18% increase in the stack level volumetric energy density can be obtained with the cryomilled SnSb—C composite compared to the baseline LCO/graphite cell (726 Wh/L). Note that the volumetric energy density of the modeled cell with cryomilled SnSb—C anode is likely to be higher since −250% volume expansion was assumed based on the theoretical density differences between SnSb and fully-lithiated SnSb to prevent overestimation. A further reliable estimation of the anode volume expansion and energy density can be conducted through in-situ transmission X-ray tomography (TXM) studies during electrochemical cycling.

Based on the structural and electrochemical characterization, the major improvement on cycling stability on the SnSb—C composite can be attributed to the nanostructures from the cryomilling process, namely the refined grain size and the well-dispersed graphite within the SnSb. For example, the empirical description of microstructure development during ball milling into three stages can include: 1) localized deformation occurs in shear bands (the region with a high dislocation density), 2) after a certain strain level is reached, nanometer-sized sub-grains form via dislocation recombination, 3) finally, randomly oriented single-crystalline grains recrystallize from sub-grain structure. The competing process of dislocation generation during plastic deformation and grain recovery by thermal effects determines the minimum grain size achievable of the milling process. At cryogenic temperature, the recovery, recrystallization, and grain growth can be limited. Therefore, fine-grained structure could be achieved with shorter milling time. A theoretical dislocation model for milling minimum grain size also suggests a decrease in grain size with lower milling temperature. The minimum grain size is material dependent and can be related to properties such as shear modulus, Poisson's ratio, and hardness, so the effects on milling temperature also vary with materials. More systematic studies on microstructure development of cryomill mechanical alloying can be conducted.

Due to the high specific surface area and van der Waals force, multilayered graphene and CNT tend to adhere together and form agglomerates, which makes them hard to disperse in the matrix structure. Cryomilling was found to be an effective method to exfoliate graphite flakes into nanoplatelets and prevent agglomeration in nanocomposites mixing. CNT reinforced aluminum matrix composites can be fabricated with good CNT dispersity and minimal sidewall defects. In this work, for example, the initial micron-sized graphite powder was exfoliated into nanoplatelets and evenly dispersed between the SnSb grains, which matches with the previous studies. Various forms of carbons, including graphite, graphene, CNT, and amorphous carbons are widely being used for high volume expansion anodes due to their ability to buffer volume changes from their internal void space or wrinkled structure. The well-dispersed nanoplatelets are also possible to suppress grain growth and matrix phase coarsening ($Li_3Sb$) with grain boundary pinning. Future in-situ morphology characterization during cycling through TXM and TEM are needed to elucidate the nanostructure evolution.

The example implementations show development of a new and facile synthesis method using cryogenic milling to produce stable and high energy density anode materials. The SnSb—C composite was chosen as a model system to demonstrate the improvements on nanostructure and cycling stability. The cryomilled SnSb—C showed a specific capacity of 708 mAh/g and an initial coulombic efficiency of 83%. Upon cycling, the anode showed averaged efficiency of 99.6±0.3% and capacity retention of 90% over 100 cycles. Moreover, the composite anode has a reversible volumetric capacity of 1842 Ah/L, and the calculated full cell stacking volumetric energy density of 855 Wh/L for $LiCoO_2$/SnSb—C cell. This corresponds to an 18% increase compared to the baseline $LiCoO_2$/graphite cell. According to STEM and post-cycling SEM, the refined grain size and well-dispersed carbon matrix structure can alleviate the volume expansion and particle cracking during cycling. This example work demonstrates the application of cryomilling on battery electrode materials and shows improved cycle life compared with the conventional ball mill routes. Cryomilling can potentially be applied to improve other battery electrode materials and pave the paths toward high-performance energy storage systems.

As discussed above and in this patent disclosure, a new cryogenic milling technique was demonstrated as a facile method to fabricate nanostructured battery electrode materials. In some of the examples described, a SnSb anode material with 1.2 wt % graphite was selected as a model system to demonstrate the feasibility and benefits of this method. Ball milling under cryogenic temperature can suppress cold welding, exfoliate bulk graphite powder into graphene nanoplatelets, and evenly disperse them between the grains. Transmission electron microscopy and post-cycling scanning electron microscopy showed refined grain sizes and well-dispersed graphene nanoplatelets, which can alleviate the volume expansion and particle cracking upon cycling. The example implementations demonstrated a cryomilled SnSb—C composite anode showed a reversible volumetric capacity of 1842 Ah/L, averaged efficiency of 99.6±0.3%, and capacity retention of 90% over 100 cycles. The cryomilled sample showed improved electrochemical performance compared to the conventional ball milled specimen. As such, the disclosed cryogenic milling technology is a promising technique to fabricate a range of high-performance nanostructured electrode material for the next-generation batteries beyond SnSb.

Figure 9A:
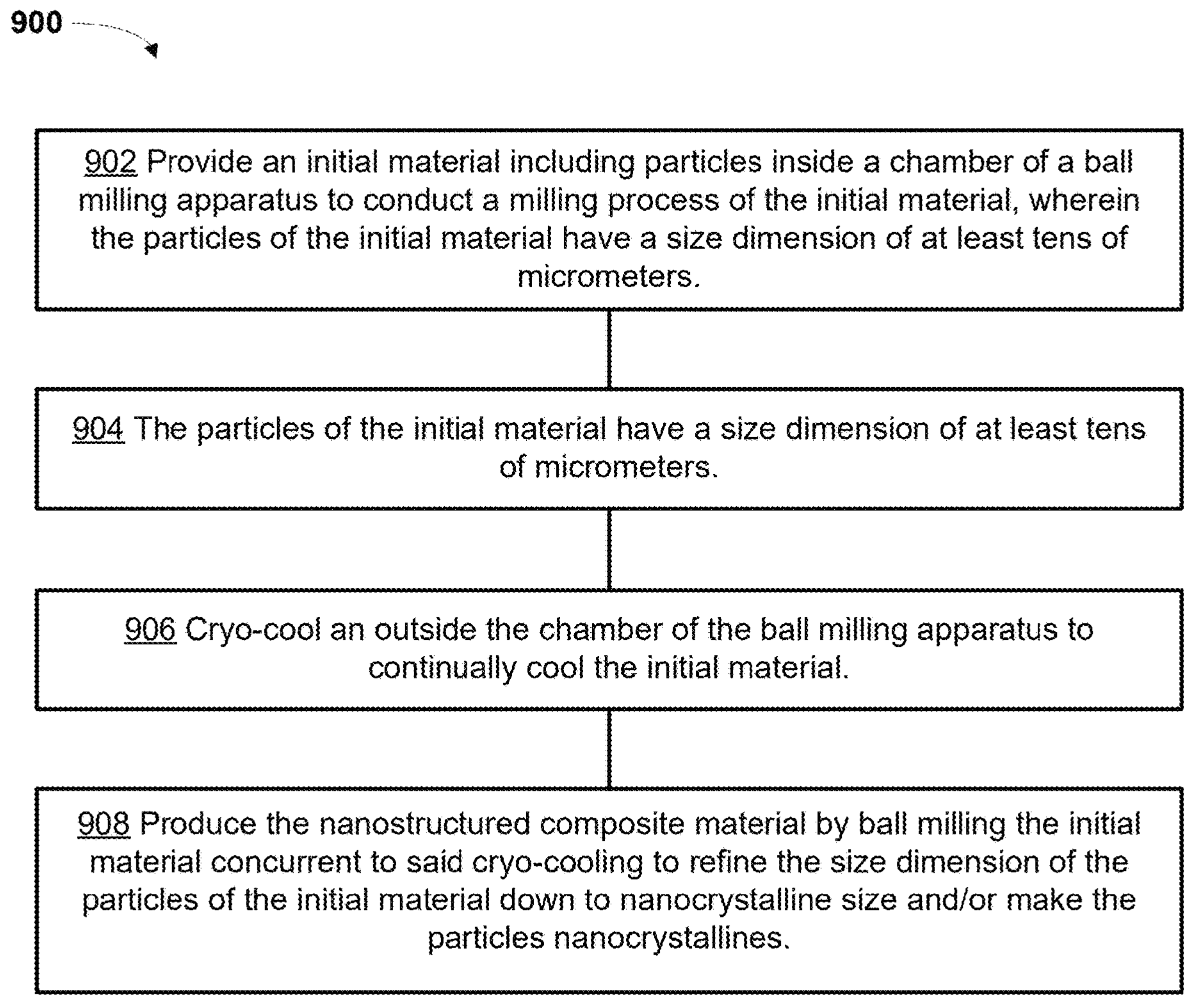
FIGS. 9A and 9B show flowcharts describing example embodiments of cryomilling methods for fabricating nanostructured composite materials in accordance with the present technology.
Figure 9B:
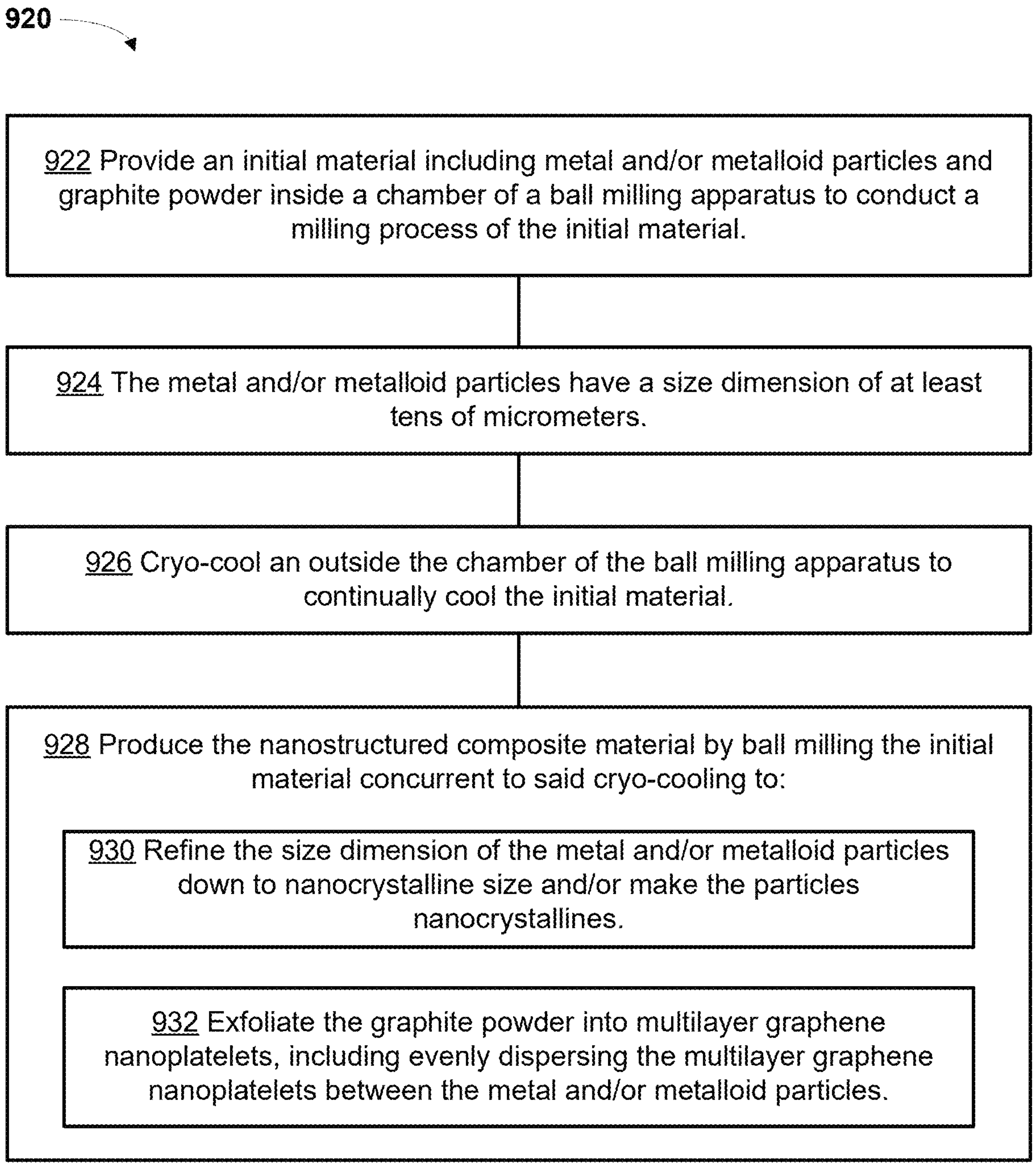

FIGS. 9A and 9B illustrate flowcharts describing cryomilling methods for fabricating nanostructured composite materials in accordance with the present technology. In FIG. 9A, a method 900 for fabricating a nanostructured composite material using cryo-milling includes providing (902) an initial material including particles inside a chamber of a ball milling apparatus to conduct a milling process of the initial material. For example, as shown in FIG. 1B, an initial material 102 including particles is provided inside a chamber 104 of a cryo-milling apparatus together with a set of milling balls 108 (e.g., a set of 3, 4, 5, or, 6 milling balls). In some embodiments, the particles of the initial material have (904) a size dimension of at least tens of micrometers. For example, the initial material includes a powder having metal and/or metalloid particles with a size dimension of at least 10 micrometers, 25 micrometers, 50 micrometers, 75 micrometers, or at least 100 micrometers. In some embodiments, for example, the initial material includes two types of materials selected from metals and metalloids. In some embodiments, the initial material includes materials selected from metals and metalloids as well as non-metal materials (e.g., carbon material). In some embodiments, for example, the initial material includes three or more types of materials selected from metals and metalloids. In some embodiments, for example, the initial material includes tin (Sn) and antimony (Sb) which are excellent candidates for electrode materials due to the high theoretical capacity of intermetallic SnSb particles, stability of the particles as well as a high energy density of SnSb particles. For example, the nanostructured composite materials described with respect to FIGS. 1-6 include SnSb particles. In some embodiments, other combinations of one or more metals and/or one or more metalloids can be provided to cryomilling. In some embodiments, combinations of one or more metals and/or metalloids with a non-meals can be provided to cryomilling. In some embodiments, the combinations include materials suitable for metal electrodes, oxide electrodes, and/or sulfide electrodes. The ratios of weight percentages of the particles of initial materials are selected to optimize the production of nano structures composite material with the desired particle size and/or electrode properties. In some embodiments, for example, the weight percentages of the materials are selected to be equal or approximately equal (e.g., 1:1 weight percentage ratio, or 1:1:1 weight percentage ratio). In some embodiments, for example, a weight percentage of tin ranges from 45 wt % to 55 wt %, and a weight percentage of antimony ranges from 45 wt % to 55 wt %. In some embodiments, for example, the weight percentage of tin is approximately 50% and the weight percentage of antimony is approximately 50%.

In some embodiments of the method 900, for example, the method 900 further includes providing a secondary material inside the chamber of the ball milling apparatus to conduct the milling process of the initial material and the secondary material. In some embodiments, for example, the initial material including particles selected from metals and/or metalloids is cryomilled for a period of time prior to adding the secondary material (e.g., 5-25 mins). In some embodiments, for example, the initial material including the particles selected from metals and/or metalloids is milled at room temperature prior to adding the secondary material. In some embodiments, for example, the secondary material is provided to the chamber at the same time as the initial material (e.g., the initial material includes the particles selected from metals and/or metalloids as well as the secondary material). In some embodiments, for example, the secondary material is a carbon material (e.g., graphite, carbon nanotubes (CNT), graphene, fullerene, etc.). In some embodiments, for example, the secondary material is bulk graphite powder. The weight percentage of the secondary materials, such as graphite, is significantly lower than the weight percentage of the initial material. In some embodiments, for example, a weight percentage of the graphite material in the initial material is ranging from 0.5 wt % to 5 wt % while the weight percentage of tin ranges from 45 wt % to 55 wt % and the weight percentage of antimony ranges from 45 wt % to 55 wt %. For example, the exemplary initial material described in the "Material synthesis" section above includes 48.78 wt % Sn, 50.02 wt % Sb, and 1.2 wt % graphite.

Method 900 further includes cryo-cooling (906) an outside the chamber of the ball milling apparatus to continually cool the initial material. As shown in FIG. 1B, an outside wall of the chamber 104 including the initial material 102 is cooled by liquid nitrogen ($LN_2$) which is circulating in the cooling chamber 106 surrounding the chamber 104. In some embodiments, for example, the circulation includes adding amounts of liquid nitrogen to the cooling chamber 106 through an inlet tube (e.g., the upper tube shown in FIG. 1B) while allowing excess liquid nitrogen to exit via an outlet tube (e.g., the lower tube shown in FIG. 1B) while monitoring the temperature of the chamber 104. The liquid nitrogen circulation maintains a temperature of the chamber at about −196° C. during the ball milling. In some embodiments, for example, the chamber 104 is pre-cooled prior to providing the initial material to the chamber 104 (e.g., for 5 mins, 10 mins, or 15 mins) by liquid nitrogen circulation.

In some embodiments, the initial material is ball milled for at least one hour in a series of milling cycles and non-milling cycles. In some embodiments, the initial material is ball milled for at least 4 hours. In some embodiments, the initial material is milled for four hours. For example, the initial material is milled for 25 mins and let stand (without milling) for 5 mins. Such cycles of milling and non-milling are repeated in series to achieve the desired milling time (e.g., repeating 25 mins of milling and 5 mins of non-milling eight times to achieve four hour milling time). As described above, the physical properties of the formed nanostructured composite depend on the milling time. For example, described above, after four hours of milling the particle size of the nanostructured composite was <7 μm could be observed based on the SEM image (FIG. 2 panel (a)). The average particle size was estimated to be 1.84±1.29 μm. In addition, no graphite flakes could be found, indicating most graphite was exfoliated and mixed between the SnSb particles.

Method 900 further includes producing (908) the nanostructured composite material by ball milling the initial material concurrent to said cryo-cooling to refine the size dimension of the particles of the initial material down to nanocrystalline size and/or make the particle nanocrystalline. In some embodiments, the producing the nanostructured composite material by ball milling the initial material concurrent to said cryo-cooling (at 908) can include producing micrometer secondary particles with many nanocrystalline grains and/or a nanocomposite material with internal nanoscale features. In some embodiments, the particle size of the nanostructured composite materials is significantly reduced compared to milling done at room temperatures because cryomilling efficiently alleviates cold-welding of the initial material. In some embodiments, a size dimension of the particles of the nanostructured composite material is less than 10 micrometers (e.g., as described above with respect to FIG. 2 panel (a) (e.g., less than 10 micrometers, less than 8 micrometers, less than 7 micrometers, less than 6 micrometers, less than 5 micrometers, less than 4 micrometers, less than 3 micrometers, or less than 2 micrometers). In some embodiments, for example, the size dimension of the particles of the nanostructured composite material ranges from 1 micrometer to 2 micrometers. As an example, the particle size of SnSb particles is reduced from at least tens of micrometers down to less than 10 micrometers after four hours of cryomilling. In some embodiments, alternatively or additionally, a size dimension of the particles of the nanostructured composite material is not refined to be less than 10 micrometers. Instead, the composite materials formed during the cryomilling process, have a particle size that is above 10 micrometers but each nanostructured particle is a nanocomposite with nanoscale features inside the particle.

In some embodiments, the nanostructured composite material includes elongated particles. In some embodiments, for example, the elongated particles have a width ranging from 10 nanometers to 50 nanometers (e.g., as described with respect to FIG. 2, panels (d) and (e)).

Furthermore, cryomilling enables distributing the carbon material (e.g., graphite) between alloy/intermetallic particles formed from the metal and/or metalloid particles (e.g., SnSb particles) of the initial materials. In some embodiments, the nanostructured composite material includes multilayer graphene nanoplatelets (e.g., nanometer-thick graphene nanoplatelets) homogenously exfoliated within alloy/intermetallic particles produced from the particles of the initial material. In some embodiments, the multilayer graphene nanoplatelets form a layer having a thickness less than 10 nm within the alloy/intermetallic particles. For example, as described with respect to FIG. 2 panel (e), a 3 nm thick layer of multilayer graphene nanoplatelets between the SnSb particles was observed.

In some implementations, for example, the nanostructured composite material is capable of effectively suppressing particle fracture upon cyclic voltammetry and decreasing capacity decay. For example, particle fracture under cyclic voltammetry may cause a side reaction with an electrolyte causing reduction of Coulombic efficiency and fast decay of capacity. The nanostructured composite material, however, demonstrated no obvious cracking after 20 cycles of testing, as described above with respect to FIG. 6.

In some embodiments, the method 900 further includes forming an electrode component comprising nanostructured composite material, wherein the electrode component is used in a lithium-ion battery. In some embodiments, for example, forming the electrode component includes mixing the nanostructured composite material with carbon fiber and carboxymethyl cellulose in water, as described above (e.g., see, section “Electrochemical characterization”). The mixed slurry is cast (e.g., by using a doctor blade and an automatic tape casting coater) on a copper foil and dried. Electrode discs are punched from the dried composite material mixture.

In some embodiments, the nanostructured composite material is applicable as an electrode structure of a lithium-ion battery. In some embodiments, the nanostructured composite material is capable of high volumetric/gravimetric capacity and a good cycle life. In some embodiments, the nanostructured composite material has a Coulombic efficiency above 99%. In some embodiments, the nanostructured composite material is non-porous (e.g., 0.0044 $cm^3/g$ porosity). In some embodiments, the nanostructured composite material has a gravimetric capacity of 669 mAh/g after 50 voltammetric cycles at 100 mA/g. Furthermore, the nanostructured composite material demonstrates a volumetric capacity above 1800 Ah/L (e.g., 1842 Ah/L). In some embodiments, the nanostructured composite material demonstrates a volumetric capacity ranging from 1800 Ah/L to 2000 Ah/L.

FIG. 9B illustrates a method 920 for fabricating a nanostructured composite material including carbon using cryomilling. The method 920 is similar to the method 900, with the included feature that the initial material includes metal and/or metalloid particles as well as graphite powder. The method 920 includes providing (922) an initial material including metal and/or metalloid particles and graphite powder inside a chamber of a ball milling apparatus to conduct a milling process of the initial material. The metal and/or metalloid particles have (924) a size dimension of at least tens of micrometers. The method 920 further includes (926) cryo-cooling an outside the chamber of the ball milling apparatus to continually cool the initial material. The method 920 further includes producing (928) the nanostructured composite material by ball milling the initial material concurrent to said cryo-cooling to: refine (930) the size dimension of the metal and/or metalloid particles down to nanocrystalline size and/or make the particle nanocrystalline and exfoliate (932) the graphite powder into multilayer graphene nanoplatelets, including evenly dispersing the multilayer graphene nanoplatelets between the metal and/or metalloid particles. For details with respect to steps 922-932 see the description of steps 902-908 of the method 900 in FIG. 9A.

EXAMPLES

In some embodiments in accordance with the present technology (example 1), a cryogenic milling method for a fabricating nanostructured composite material includes providing an initial material including particles inside a chamber of a ball milling apparatus to conduct a milling process of the initial material, wherein the particles of the initial material have a size dimension of at least tens of micrometers (e.g., at least 10 micrometers); cryo-cooling an outside of the chamber of the ball milling apparatus to continually cool the initial material; and producing the nanostructured composite material by ball milling the initial material concurrent to said cryo-cooling to refine the size dimension of the particles of the initial material down to nanocrystalline size.

Example 2 includes the method of any of examples 1-22, wherein the initial material includes two types of materials selected from metals and metalloids.

Example 3 includes the method of example 2 or any of examples 1-22, wherein the initial material includes tin and antimony.

Example 4 includes the method of example 3 or any of examples 1-22, wherein a weight percentage of tin ranges from 45 wt % to 55 wt % and a weight percentage of antimony ranges from 45 wt % to 55 wt %.

Example 5 includes the method of any of examples 1-22, wherein the initial material further includes a carbon material.

Example 6 includes the method of example 5 or any of examples 1-22, wherein a weight percentage of the carbon material in the initial material is ranging from 0.5 wt % to 5 wt %.

Example 7 includes the method of example 5 or any of examples 1-22, wherein the carbon material is graphite powder.

Example 8 includes the method of example 7 or any of examples 1-22, wherein the nanostructured composite material includes multilayer graphene nanoplatelets homogenously exfoliated within alloy/intermetallic particles produced from the particles of the initial material.

Example 9 includes the method of example 8 or any of examples 1-22, wherein the multilayer graphene nanoplatelets form a layer having a thickness less than 20 nm within the alloy/intermetallic particles.

Example 10 includes the method of any of examples 1-22, further including providing a secondary material inside the chamber of the ball milling apparatus to conduct the milling process of the initial material and the secondary material.

Example 11 includes the method of example 10 or any of examples 1-22, wherein the secondary material is graphite powder.

Example 12 includes the method of any of examples 1-22, wherein a size dimension of the particles of the nanostructured composite material is less than 10 micrometers.

Example 13 includes the method of example 12 or any of examples 1-22, wherein the size dimension of the particles of the nanostructured composite material ranges from 1 micrometer to 2 micrometers.

Example 14 includes the method of any of examples 1-22, wherein the nanostructured composite material includes elongated particles.

Example 15 includes the method of example 14 or any of examples 1-22, wherein the elongated particles have a width ranging from 10 nanometers to 50 nanometers.

Example 16 includes the method of any of examples 1-22, wherein the nanostructured composite material is applicable as an electrode structure of a lithium-ion battery.

Example 17 includes the method of any of examples 1-22, wherein the initial material is ball milled for a time period ranging from one hour to four hours in a series of milling cycles and non-milling cycles.

Example 18 includes the method of any of examples 1-22, wherein said cryo-cooling of the outside of the chamber includes maintaining a temperature of the chamber at about −196° C. during the ball milling.

Example 19 includes the method of any of examples 1-22, wherein said cryo-cooling includes circulating liquid nitrogen along the outside of the chamber of the ball milling apparatus.

Example 20 includes the method of any of examples 1-22, further comprising pre-cooling the chamber of the ball milling apparatus prior to the providing the initial material.

Example 21 includes the method of example 20 or any of examples 1-22, wherein said pre-cooling includes circulating liquid nitrogen along the outside the chamber of the ball milling apparatus.

Example 22 includes the method of any of examples 1-22, further comprising forming an electrode component comprising nanostructured composite material, wherein the electrode component is used in a lithium-ion battery.

In some embodiments in accordance with the present technology (example 23), a nanostructured composite material includes alloy/intermetallic particles including two types of materials selected from metals and metalloids; and multilayer graphene nanoplatelets exfoliated within the alloy/intermetallic particles, wherein at least some of the alloy/intermetallic particles have a size dimension that is less than 10 micrometers, and/or wherein at least some of the alloy/intermetallic particles have a size dimension that is above than 10 micrometers and have a nanoscale feature inside a respective alloy/intermetallic particle.

Example 24 includes the material of any of examples 23-32, wherein the alloy/intermetallic particles include tin and antimony.

Example 25 includes the material of example 24 or any of examples 23-32, wherein a weight percentage of tin ranges from 45 wt % to 55 wt % and a weight percentage of antimony ranges from 45 wt % to 55 wt %.

Example 26 includes the material of any of examples 23-32, wherein a weight percentage of the multilayer graphene nanoplatelets is ranging from 0.5 wt % to 5 wt %.

Example 27 includes the material of example 26 or any of examples 23-32, wherein the multilayer graphene nanoplatelets form a layer having a thickness less than 20 nm within the alloy/intermetallic particles.

Example 28 includes the material of any of examples 23-32, wherein the size dimension of the intermetallic particles of the alloy/intermetallic particles ranges from 1 micrometer to 2 micrometers.

Example 29 includes the material of any of examples 23-32, wherein the alloy/intermetallic particles are elongated.

Example 30 includes the material of example 29 or any of examples 23-32, wherein the elongated particles have a width ranging from 10 nanometers to 50 nanometers.

Example 31 includes the material of any of examples 23-32, wherein the nanostructured composite material is applicable as electrode material for lithium-ion batteries.

Example 32 includes the material of any of examples 23-32, wherein the nanostructured composite material has a Coulombic efficiency above 99%.

In some embodiments in accordance with the present technology (example 33), a nanostructured composite material made by a method that includes providing an initial material including particles inside a chamber of a ball milling apparatus to conduct a milling process of the initial material, wherein the particles of the initial material have a size dimension of at least tens of micrometers; cryo-cooling an outside of the chamber of the ball milling apparatus to continually cool the initial material; and producing the nanostructured composite material by ball milling the initial material concurrent to said cryo-cooling to refine the size dimension of the particles of the initial material down to nanocrystalline size.

In some embodiments in accordance with the present technology (example 34), a cryogenic milling method for fabricating a nanostructured composite material includes providing an initial material including metal and/or metalloid particles and graphite powder inside a chamber of a ball milling apparatus to conduct a milling process of the initial material, wherein the metal and/or metalloid particles have a size dimension of at least tens of micrometers; cryo-cooling an outside of the chamber of the ball milling apparatus to continually cool the initial material; and producing the nanostructured composite material by ball milling the initial material concurrent to said cryo-cooling to refine the size dimension of the metal and/or metalloid particles down to nanocrystalline size and exfoliate the graphite powder into multilayer graphene nanoplatelets, including evenly dispersing the multilayer graphene nanoplatelets between the metal and/or metalloid particles.

Example 35 includes the method of any of examples 1-22, wherein the initial material is ball milled for a time period ranging from one hour to four hours in a series of milling cycles and cooling cycles.

Example 36 includes the method of any of examples 1-22, wherein said cryo-cooling of the outside of the chamber includes maintaining a temperature of the chamber at about −196° C. during the ball milling.

Example 37 includes the method of any of examples 1-22, wherein said cryo-cooling includes circulating liquid nitrogen along the outside of the chamber of the ball milling apparatus.

Example 38 includes the method of any of examples 1-22, further comprising pre-cooling the chamber of the ball milling apparatus prior to the providing the initial material.

Example 39 includes the method of example 38 or any of examples 1-22, wherein the pre-cooling includes circulating liquid nitrogen along the outside the chamber of the ball milling apparatus.

Example 40 includes the method of any of examples 1-22, further comprising forming an electrode component comprising nanostructured composite material, wherein the electrode component is used in a lithium-ion battery.

It is intended that the specification, together with the drawings, be considered exemplary only, where exemplary means an example. As used herein, the singular forms "a", "an", and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A cryogenic milling method for a fabricating nanostructured composite material, the method comprising:

providing an initial material including particles inside a chamber of a ball milling apparatus to conduct a milling process of the initial material, wherein the particles of the initial material have a size dimension of at least tens of micrometers;

cryo-cooling an outside of the chamber of the ball milling apparatus to continually cool the initial material; and producing the nanostructured composite material by ball milling the initial material concurrent to said cryo-cooling to refine the size dimension of the particles of the initial material down to nanocrystalline size.

2. The method of claim 1, wherein the initial material includes two types of materials selected from metals and metalloids.

3. The method of claim 2, wherein the initial material includes tin and antimony.

4. The method of claim 3, wherein a weight percentage of tin ranges from 45 wt % to 55 wt % and a weight percentage of antimony ranges from 45 wt % to 55 wt %.

5. The method of claim 1, wherein the initial material further includes a carbon material.

6. The method of claim 5, wherein a weight percentage of the carbon material in the initial material is ranging from 0.5 wt % to 5 wt %.

7. The method of claim 5, wherein the carbon material is graphite powder.

8. The method of claim 7, wherein the nanostructured composite material includes multilayer graphene nanoplatelets homogenously exfoliated within alloy/intermetallic particles produced from the particles of the initial material.

9. The method of claim 1, further including providing a secondary material inside the chamber of the ball milling apparatus to conduct the milling process of the initial material and the secondary material.

10. The method of claim 9, wherein the secondary material is graphite powder.

11. The method of claim 1, wherein a size dimension of the particles of the nanostructured composite material is less than 10 micrometers.

12. The method of claim 11, wherein the size dimension of the particles of the nanostructured composite material ranges from 1 micrometer to 2 micrometers.

13. The method of claim 1, wherein the nanostructured composite material includes elongated particles.

14. The method of claim 1, wherein said cryo-cooling of the outside of the chamber includes maintaining a temperature of the chamber at about −196° C. during the ball milling.

15. The method of claim 1, further comprising:

forming an electrode component comprising nanostructured composite material, wherein the electrode component is used in a lithium-ion battery.

* * * * *